United States Patent [19]

Myers, deceased et al.

[11] 4,417,975
[45] Nov. 29, 1983

[54] ADDITION OF WATER TO REGENERATION AIR

[75] Inventors: George D. Myers, deceased, late of Ashland, Ky., by Virginia K. Myers, administratrix; Lloyd E. Busch, Ashland, Ky.

[73] Assignee: Ashland Oil, Inc., Ashland, Ky.

[21] Appl. No.: 251,032

[22] Filed: Apr. 3, 1981

Related U.S. Application Data

[63] Continuation-in-part of Ser. No. 99,050, Nov. 30, 1980, abandoned, which is a continuation of Ser. No. 969,601, Dec. 14, 1978, abandoned.

[51] Int. Cl.³ .................. C10G 11/05; C10G 11/18; B01J 29/38; B01J 21/20
[52] U.S. Cl. .................. 208/120; 208/113; 208/164; 422/144; 502/55
[58] Field of Search .............. 208/120, 187, 113, 127, 208/48 R, 48 AA, 48 Q, 130, 164, 161; 252/411 R, 411 S, 415, 417, 418, 419, 420

[56] References Cited

U.S. PATENT DOCUMENTS

| | | | |
|---|---|---|---|
| 2,374,660 | 5/1945 | Belchetz et al. | 252/242 |
| 2,427,112 | 9/1947 | Tyson | 196/52 |
| 2,431,462 | 11/1947 | Campbell et al. | 252/417 |
| 2,661,321 | 12/1953 | Schutte | 208/174 |
| 2,951,806 | 9/1960 | Walser | 252/418 |
| 3,295,897 | 1/1967 | Erickson et al. | 302/66 |
| 3,410,793 | 11/1968 | Strnahan et al. | 252/417 |
| 3,494,858 | 2/1970 | Luckenbach | 208/155 |
| 3,557,019 | 1/1971 | Van Driesen | 252/416 |
| 3,770,615 | 11/1973 | Blazek | 208/120 |
| 3,909,392 | 9/1975 | Horecky, Jr. et al. | 208/120 |
| 4,070,159 | 1/1978 | Myers et al. | 252/417 |
| 4,099,927 | 7/1978 | McKinney | 23/288 B |
| 4,162,213 | 7/1979 | Zrinscak, Sr. et al. | 208/120 |
| 4,176,084 | 11/1979 | Luckenbach | 208/120 |
| 4,243,514 | 1/1981 | Bartholic | 208/307 |
| 4,244,811 | 1/1981 | Grenoble et al. | 252/419 |

Primary Examiner—P. E. Konopka
Attorney, Agent, or Firm—Richard C. Willson, Jr.; Charles A. McCrae

[57] ABSTRACT

A process for economically converting carbo-metallic oils to lighter products. This process comprises flowing the carbo-metallic oil together with particulate cracking catalyst through a progressive flow type reactor having an elongated reaction chamber, which is at least in part vertical or inclined, for a predetermined vapor riser residence time in the range of about 0.5 to about 10 seconds, at a temperature of about 900 to about 1400° F., and under a pressure of about 10 to about 50 pounds per square inch absolute sufficient for causing a conversion per pass in the range of about 50% to about 90% while producing coke in amounts in the range of about 6 to about 14% by weight based on fresh feed, and laying down coke on the catalyst in amounts in the range of about 0.3 to about 3% by weight. The spent, coke-laden catalyst from the stream of hydrocarbons formed by vaporized feed and resultant cracking products is separated and regenerated in one or more regeneration beds in one or more regeneration zones by burning the coke on the spent catalyst with oxygen. The bed density is in the range of about 25 to about 50 pounds per cubic foot and the bed or beds are sustained by fluidization gas containing combustion-supporting gas having a linear velocity in the range of about 0.2 to about 4 feet per second. Liquid water is added to the bed or beds in a weight ratio of water to converter feed from about 0.01 to about 0.5 to at least partly absorb the heat produced by the burning coke.

70 Claims, 1 Drawing Figure

U.S. Patent
Nov. 29, 1983
4,417,975
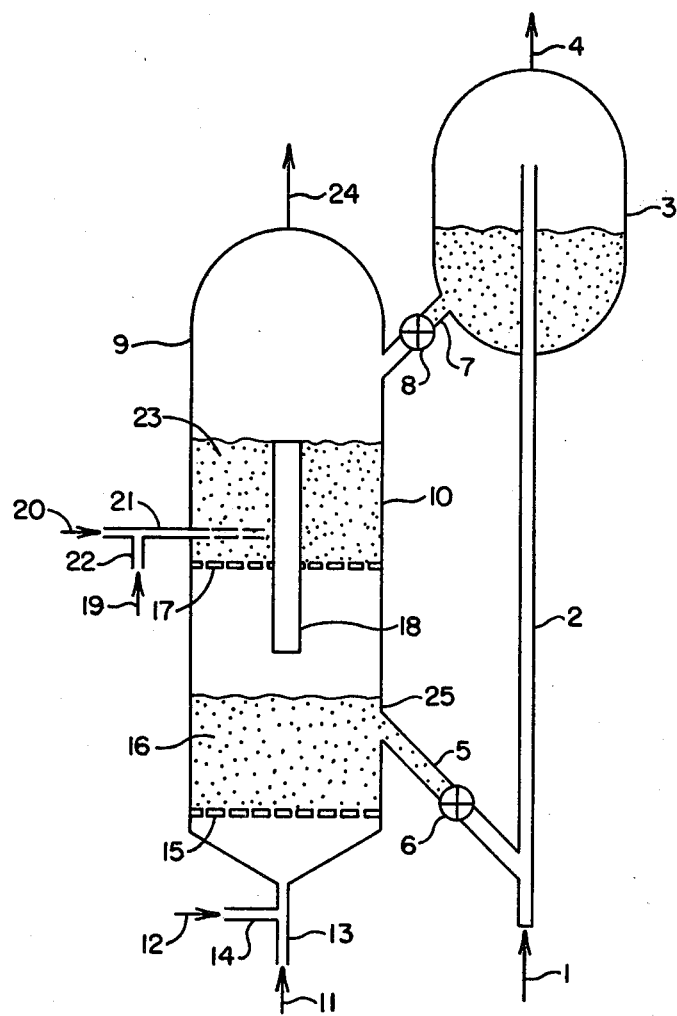

ADDITION OF WATER TO REGENERATION AIR

CROSS-REFERENCE TO RELATED APPLICATIONS

This application is a continuation-in-part of U.S. patent application Ser. No. 99,050 filed Nov. 30, 1980 for "Method for Cracking Residual Oils", now abandoned; Ser. No. 99,050 is itself a continuation of Ser. No. 969,601, filed Dec. 14, 1978, now abandoned.

Related applications include Ser. No. 228,398, filed Jan. 26, 1981, now pending, a continuation of Ser. No. 63,497, filed Aug. 3, 1979, now abandoned; and Ser. No. 969,602, filed Dec. 14, 1978, now abandoned.

The following patents are also related to the present application: U.S. Pat. No. 4,299,687, issued Nov. 10, 1981; U.S. Pat. No. 4,332,673, issued June 1, 1982; U.S. Pat. No. 4,347,122, issued Aug. 31, 1982; and Ser. No. 94,227, allowed Apr. 8, 1982.

DESCRIPTION

1. Technical Field

This invention relates to processes for converting heavy hydrocarbon oils into lighter fractions, and especially to processes for converting heavy hydrocarbons containing high concentrations of coke precursors and heavy metals into gasoline and other liquid hydrocarbon fuels.

2. Background Art

In general, gasoline and other liquid hydrocarbon fuels boil in the range of about 100° to about 650° F. However, the crude oil from which these fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures above 650° F. Among these are crudes in which about 10% to about 30% or more of the total volume consists of compounds so heavy in molecular weight that they boil above 1025° F. or at least will not boil below 1025° F. at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is that a vaporized hydrocarbon feedstock is caused to crack at an elevated temperature in contact with a cracking catalyst that is suspended in the feedstock vapors. Upon attainment of the desired degree of molecular weight and boiling point reduction the catalyst is separated from the desired products.

Crude oil in the natural state contains a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.), lighter metals (such as sodium, potassium, etc.), sulfur, nitrogen and others. Certain of these, such as the lighter metals, can be economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, the heavy metals can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy metals, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavior, while containing relatively large quantities of coke precursors, is referred to herein as a carbo-metallic oil, and represents a particular challenge to the petroleum refiner.

In general the coke-forming tendency or coke precursor content of an oil can be ascertained by determining the weight percent of carbon remaining after a sample of that oil has been pyrolyzed. The industry accepts this value as a measure of the extent to which a given oil tends to form non-catalytic coke when employed as feedstock in a catalytic cracker. Two established tests are recognized, the Conradson Carbon and Ramsbottom Carbon tests, the former being described in ASTM D189-76 and the latter being described in ASTM Test No. D524-76. In conventional FCC practice, Conradson carbon values on the order of about 0.05 to about 1.0 are regarded as indicative of acceptable feed. The present invention is concerned with the use of hydrocarbon feedstocks which have higher Conradson carbon values and thus exhibit substantially greater potential for coke formation than the usual feeds.

Since the various heavy metals are not of equal catalyst poisoning activity, it is convenient to express the poisoning activity of an oil containing a given poisoning metal or metals in terms of the amount of a single metal which is estimated to have equivalent poisoning activity.

Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed:

$$\text{Nickel Equivalents} = \text{Ni} + \frac{\text{V}}{4.8} + \frac{\text{Fe}}{7.1} + \frac{\text{Cu}}{1.23}$$

According to conventional FCC practice, the heavy metal content of feedstock for FCC processing is controlled at a relatively low level, e.g. about 0.25 ppm Nickel Equivalents or less. The present invention is concerned with the processing of feedstocks containing metals substantially in excess of this value and which therefore have a significantly greater potential for accumulating on and posoning catalyst.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents. The process of the present invention is concerned with the use of catalyst having a substantially larger metals content, and which therefore has a much greater than normal tendency to promote dehydrogenation, aromatic condensation, gas production or coke formation. Therefore, such higher metals accumulation is normally regarded as quite undesirable in FCC processing.

There has been a long standing interest in the conversion of carbo-metallic oils into gasoline and other liquid fuels. For example, in the 1950s it was suggested that a variety of carbo-metallic oils could be successfully converted to gasoline and other products in the Houdresid process. Turning from the FCC mode of operation, the Houdresid process employed catalyst particles of "granular size" (much larger than conventional FCC catalyst particle size) in a compact gravitating bed, rather than suspending catalyst particles in feed and product vapors in a fluidized bed.

Although the Houdresid process obviously represented a step forward in dealing with the effects of metal contamination and coke formation on catalyst performance, its productivity was limited. Because its operation was uneconomical, the first Houdresid unit is no longer operating. Thus, for the 25 years which have passed since the Houdresid process was first introduced commercially, the art has continued its arduous search for suitable modifications or alternatives to the FCC process which would permit commercially successful operation on reduced crude and the like. During this period a number of proposals have been made; some have been used commercially to a certain extent.

Several proposals involve treating the heavy oil feed to remove the metal therefrom prior to cracking, such as by hydrotreating, solvent extraction and complexing with Friedel-Crafts catalysts, but these techniques have been criticized as unjustified economically. Another proposal employs a combination cracking process having "dirty oil" and "clean oil" units. Still another proposal blends residual oil with gas oil and controls the quantity of residual oil in the mixture in relation to the equilibrium flash vaporization temperature at the bottom of the riser type cracker unit employed in the process. Still another proposal subjects the feed to a mild preliminary hydrocracking or hydrotreating operation before it is introduced into the cracking unit. It has also been suggested to contact a carbo-metallic oil such as reduced crude with hot taconite pellets to produce gasoline. This is a small sampling of the many proposals which have appeared in the patent literature and technical reports.

Notwithstanding the great effort which has been expended and the fact that each of these proposals overcomes some of the difficulties involved, conventional FCC practice today bears mute testimony to the dearth of carbometallic oil-cracking techniques that are both economical and highly practical in terms of technical feasibility. Some crude oils are relatively free of coke precursors or heavy metals or both, and the troublesome components of crude oil are for the most part concentrated in the highest boiling fractions. Accordingly, it has been possible to largely avoid the problems of coke precursors and heavy metals by sacrificing the liquid fuel yield which would be potentially available from the highest boiling fractions. More particularly, conventional FCC practice has employed as feedstock that a fraction of crude oil which boils at about 650° F. to about 1000° F., such fractions being relatively free of coke precursors and heavy metal contamination. Such feedstock, known as "vacuum gas oil" (VGO) is generally prepared from crude oil by distilling off the fractions boiling below about 650° F. at atmospheric pressure and then separating by further vacuum distillation from the heavier fractions a cut boiling between about 650° F. and about 900° to 1025° F.

The vacuum gas oil is used as feedstock for conventional FCC processing. The heavier fractions are normally employed for a variety of other purposes, such as for instance production of asphalt, residual fuel oil, #6 fuel oil, or marine Bunker C fuel oil, which represents a great waste of the potential value of this portion of the crude oil, especially in light of the great effort and expense which the art has been willing to expend in the attempt to produce generally similar materials from coal and shale oils. The present invention is aimed at the simultaneous cracking of these heavier fractions containing substantial quantities of both coke precursors and heavy metals, and possibly other troublesome components, in conjunction with the lighter oils, thereby increasing the overall yield of gasoline and other hydrocarbon liquid fuels from a given quantity of crude. As indicated above, the present invention by no means constitutes the first attempt to develop such a process, but the long standing recognition of the desirability of cracking carbo-metallic feedstocks, along with the slow progress of the industry toward doing so, show the continuing need for such a process. It is believed that the present process is uniquely advantageous for dealing with the problem of treating such carbo-metallic oils in an economically and technically sound manner.

One method for cracking these high boiling fractions, named Reduced Crude Conversion (RCC) after a particularly common and useful carbo-metallic feed, is disclosed in copending application Ser. No. 94,216 (now U.S. Pat. No. 4,341,624) filed Nov. 14, 1979 for "Carbo-Metallic Oil Conversion". The oils disclosed as capable of being cracked by the method of that application are carbo-metallic oils of at least about 70 percent of which boil above 650° F. and containing a carbon residue on pyrolysis of at least about 1 and at least about 4 parts per million of nickel equivalents of heavy metals. Examples of these oils are crude oils, topped crudes, reduced crudes, residua, and extracts from solvent de-asphalting.

The cracking reaction for the method disclosed in application Ser. No. 94,216 is sufficiently severe to convert 50% or more of the feedstock to gasoline per pass and produce coke in the amount of 6 to 14% by weight based on weight of fresh feed. In a typical RCC cracking process the ratio of weight of catalyst to weight of feedstock is from about 3 to about 18, coke is laid down on the catalyst in amounts in the range of about 0.3 to about 3 percent by weight based on the weight of the catalyst, and heavy metals accumulate on the catalyst to a concentration of from about 3000 to about 30,000 ppm nickel equivalents.

The unusually large amount of coke which deposits on the catalyst in carbo-metallic oil processing presents critical problems, the primary problem arising from the fact that the reactions in the regenerator which convert coke to water, carbon monoxide and carbon dioxide are highly exothermic. Using a carbo-metallic feed with its unusually high content of coke precursors as compared to FCC feeds, can increase the amount of coke burned in the regenerator and the temperature in the regenerator to the point that regeneration temperatures become excessive if there is thorough burning of coke. Excessive temperatures can permanently deactivate the catalyst and/or damage the regenerating equipment.

The heat of combustion of coke depends upon the concentration of hydrogen in the coke and the ratio of $CO_2$ to CO in the products of combustion. Carbon produces 13,910 BTU per pound when burned to $CO_2$ and only 3,962 BTU per pound when burned to CO. Hydrogen produces 61,485 BTU per pound when burned to $H_2O$. The heats of combustion of coke for three representative levels of hydrogen and four different ratios of $CO_2/CO$ are given in the following table:

TABLE I

| | Heat of Combustion BTU/lb Coke | | |
|---|---|---|---|
| | Percent Hydrogen | | |
| $CO_2CO$ Ratio | 2 | 4 | 6 |
| 0.5 | 8,362 | 9,472 | 10,582 |
| 1.0 | | 11,038 | 12,083 |
| 3.0 | | | 14,446 |
| 4.0 | 12,912 | | 14,894 |

These problems encountered in regenerating catalysts coated with a high concentration of coke may be exacerbated when catalysts of the zeolite or molecular sieve type are used. These catalysts, which are crystalline aluminosilicates made up of tetra-coordinated aluminum atoms associated through oxygen atoms with silicon atoms in the crystalline structure, tend to be less susceptible than prior amorphous silica-alumina catalysts in respect to loss of cracking activity upon extended exposure to high temperatures. Also, they have been shown to be more adversely affected by coke in respect to loss of cracking activity, than are certain other catalysts, such as for example the non-zeolite, silica-alumina catalysts.

Various methods have been used to control the temperature in the regeneration zone including cooling by heat exchangers external to the regenerator (see U.S. Pat. No. 2,394,710), cooling by injecting steam or water into an upper, dilute phase zone of a regenerator (see U.S. Pat. No. 3,909,392), and controlling the oxidation reaction by controlling the amount of oxygen present (see U.S. Pat. No. 3,161,583).

These and other methods which have been proposed control the overall temperature of the regenerator, or the temperature within specific zones, for conventional FCC feedstocks having Conradson carbon residues below about one percent. However, they have one or more disadvantages even for these conventional FCC feedstocks of not closely controlling the temperature of the bed of catalyst being oxidized, or involving a time lag which permit the temperature of the bed to increase to an unacceptable level before being cooled. When the feedstocks contain Conradson carbon residues greater than about two percent, proper heat balance requires a method of heat control other than those normally used.

DISCLOSURE OF THE INVENTION

Accordingly it is one object of this invention to provide a method for converting carbo-metallic oils to liquid fuels wherein the temperature within the catalyst regenerator is closely controlled.

It is another object to provide a carbo-metallic oil conversion process involving controlling the temperature within the regenerator wherein the weight of coke burned is at least about 0.5% of the weight of the catalyst.

It is still another object to provide a carbo-metallic oil conversion process wherein relatively large quantities of heat may be removed from a bed of fluidized catalyst particles in a regenerator.

It is yet another object to provide a carbo-metallic oil conversion process including provision for removing excess heat from catalyst particles used in cracking feedstocks having Conradson carbon values of about 2% or more.

In accordance with this invention, a carbo-metallic oil conversion process has been provided wherein the temperature within a catalyst regenerator is controlled by introducing liquid water into a catalyst bed in the regenerator.

U.S. Patent Application Ser. Nos. 94,091 and 94,227 (now U.S. Pat. Nos. 4,229,687 and 4,354,923), filed Nov. 14, 1979 disclose processes for the conversion of carbo-metallic oils to liquid fuel in which various regeneration techniques are employed that assist in controlling the heat load in the regeneration step. It is thought that the ratio of $CO_2$ to CO may be decreased to no more than about 4 and preferably to less than about 3 in order to reduce the amount of energy released within the regenerator, while optionally providing a flue gas high enough in CO content to be a useful fuel. As will be appreciated the carbo-metallic oils can vary widely in their Conradson carbon content. Such varying content of carbon residue in the feedstock, along with variations in riser operating conditions such as catalyst to oil ratio and others, can result in wide variations of the percent coke found on the spent catalyst. Accordingly, where the feed and riser operating conditions are such as to produce rather large coke yields, necessitating the burning of very substantial amounts of coke from the catalyst in regeneration, such as at least about 0.5 weight percent based on the catalyst, or more, additional measures for controlling the heat load in the regenerator may prove useful. The purpose of the present invention is to meet this need.

SUMMARY OF THE INVENTION

The present invention is notable in providing a simple, relatively straightforward and highly productive approach to the conversion of carbo-metallic feed such as reduced crude or the like to various lighter products such as gasoline. The carbo-metallic feed comprises or is composed of oil which boils above about 650° F. Such oil, or at least the 650° F.+ portion thereof, is characterized by a heavy metal content of at least about 4, preferably more than about 5, and most preferably at least about 5.5 ppm of Nickel Equivalents by weight and by a carbon residue on pyrolysis of at least about 1% and more preferably at least about 2% by weight. In accordance with the invention, the carbo-metallic feed, in the form of a pumpable liquid, is brought into contact with hot conversion catalyst in a weight ratio of catalyst to feed in the range of about 3 to about 18 and preferably more than about 6.

The feed in said mixture undergoes a conversion step which includes cracking while the mixture of feed and catalyst is flowing through a progressive flow type reactor. The feed, catalyst, and other materials may be introduced at one or more points. The reactor includes an elongated reaction chamber which is at least partly vertical or inclined and in which the feed material, resultant products and catalyst are maintained in contact with one another while flowing as a dilute phase or stream for a predetermined riser residence time in the range of about 0.5 to about 10 seconds.

The reaction is conducted at a temperature of about 900° to about 1400° F., measured at the reaction chamber exit, under a total pressure of about 10 to about 50 psia (pounds per square inch absolute) under conditions sufficiently severe to provide a conversion per pass in the range of about 50% or more and to lay down coke on the catalyst in an amount in the range of about 0.3 to about 3% by weight and preferably at least about 0.5%. The overall rate of coke production, based on weight of fresh feed, is in the range of about 4 to about 14% by weight.

At the end of the predetermined residence time, the catalyst is separated from the products, is stripped to remove high boiling components and other entrained or adsorbed hydrocarbons and is then regenerated with oxygen-containing combustion-supporting gas under conditions of time, temperature and atmosphere sufficient to reduce the carbon on the regenerated catalyst to about 0.25% or less and preferably about 0.05% or less by weight.

In the regeneration zone the coke-laden catalyst particles are fluidized in a bed sustained by a flow of the combustion-supporting gas, droplets of liquid water, and steam resulting from vaporization of the liquid water. Cooling of the catalyst particles is achieved, throughout the bed volume, by converting a portion of the heat in the catalyst particles to sensible heat of water as the temperature of the water droplets is raised to the boiling point, by conversion to latent heat of vaporization as the water droplets vaporize, by conversion of some of the heat in the catalyst particles to sensible heat of steam as the temperature of the steam resulting from vaporization of the water droplets is increased. By introducing liquid water into the bed of catalyst particles cooling is effected on a microscale, and the temperature of the individual particles within the bed is closely controlled. In addition, the cooling is effected at a point where high temperatures within the bed are most likely to exist, i.e. where the concentration of oxygen is highest. The regenerated catalyst is then recycled to the reactor for contact with fresh feed.

This invention provides a method for converting carbometallic oils to liquid fuels wherein bed temperatures within the regenerator are controlled over a wide range of heat removal requirements. The invention is especially useful in meeting the heat removal requirements involved in regenerating catalyst which has been used in cracking carbo-metallic oils containing high concentrations of coke precursors and heavy metals and which are therefore heavily loaded with coke.

The invention further provides a method of converting carbo-metallic oils wherein the temperature within the regenerator is controlled at a level selected to achieve a desirably low ratio of $CO_2$ to $CO$, i.e. no more than about 4 and preferably less than about 3, which further helps to achieve a desired heat balance since the formation of $CO$ produces less heat than does the formation of $CO_2$.

It is noteworthy that contact with steam reportedly has an adverse effect on some catalysts at regeneration temperatures in the range of about 1250° F. to 1450° F. Therefore, prior to the present invention, it was not apparent that the net effect of adding water in accordance with the present invention would be beneficial. Although the invention is useful in regenerating any catalyst, it is especially useful in regenerating those catalysts which are sensitive to high temperature, since control of the temperature at the burning site, in accordance with the present invention reduces the occurrence of hot spots in the regenerator.

Depending on how the process of the invention is practiced, one or more of the following additional advantages may be realized. If desired, and preferably, the process may be operated without added hydrogen in the reaction chamber. If desired, and preferably, the process may be operated without prior hydrotreating of the feed and/or without other process of removal of asphaltenes of metals from the feed, and this is true even where the carbo-metallic oil as a whole contains more than about 4, or more than about 5 or even more than about 5.5 ppm Nickel Equivalents by weight of heavy metal and has a carbon residue on pyrolysis greater than about 1%, greater than about 1.4% or greater than about 2% by weight. Moreover, all of the converter feed, as above described, may be cracked in one and the same conversion chamber. The cracking reaction may be carried out with a catalyst which has previously been used (recycled, except for such replacement as required to compensate for normal losses and deactivation) to crack a carbo-metallic feed under the above described conditions. Heavy hydrocarbons not cracked to gasoline in a first pass may be recycled with or without hydrotreating for further cracking in contact with the same kind of feed in which they were first subjected to cracking conditions, and under the same kind of conditions; but operation in a substantially once-through or single pass mode (e.g. less than about 15% by volume of recycle based on volume of fresh feed) is preferred.

According to one preferred embodiment or aspect of the invention, at the end of the predetermined residence time referred to above, the catalyst is projected in a direction established by the elongated reaction chamber or an extension thereof, while the products, having lesser momentum, are caused to make an abrupt change of direction, resulting in an abrupt, substantially instantaneous ballistic separation of products from catalyst. The thus separated catalyst is then stripped, regenerated and recycled to the reactor as above described.

According to another preferred embodiment or aspect of the invention, the converter feed contains 650° F.+ material which has not been hydrotreated and is characterized in part by containing at least about 5.5 parts per million of nickel equivalents of heavy metals. The converter feed is brought together not only with the above mentioned cracking catalyst, but also with additional gaseous material including steam whereby the resultant suspension of catalyst and feed also includes gaseous material wherein the ratio of the partial pressure of the added gaseous material relative to that of the feed is in the range of about 0.25 to about 4.0. The vapor residence time is in the range of about 0.5 to about 3 seconds when practicing this embodiment or aspect of the invention. This preferred embodiment or aspect and the one referred to in the preceeding paragraph may be used in combination with one another or separately.

According to another preferred embodiment or aspect of the invention, the carbo-metallic feed is not only brought into contact with the catalyst, but also with one or more additional materials including particularly liquid water in a weight ratio relative to feed ranging from about 0.04 to about 0.25, more preferably about 0.04 to about 0.2 and still more preferably about 0.05 to about 0.15. Such additional materials, including the liquid water, may be brought into admixture with the feed prior to, during or after mixing the feed with the aforementioned catalyst, and either after or, preferably, before, vaporization of the feed. The feed, catalyst and water (e.g. in the form of liquid water or in the form of steam produced by vaporization of liquid water in contact with the feed) are introduced into the progressive flow type reactor, which may or may not be a reactor embodying the above described ballistic separation, at one or more points along the reactor. While the mixture of feed, catalyst and steam produced by vaporization of the liquid water flows through the reactor, the feed undergoes the above mentioned conversion step which includes cracking. The feed material, catalyst, steam and resultant products are maintained in contact with one another in the above mentioned elongated reaction chamber while flowing as a dilute phase or stream for the above mentioned predetermined riser residence time which is in the range of about 0.5 to about 10 seconds.

BRIEF DESCRIPTION OF THE DRAWING

The FIGURE is a schematic design of catalyst regeneration apparatus and associated cracking apparatus which may be used in carrying out this invention.

DESCRIPTION OF BEST AND VARIOUS OTHER ILLUSTRATIVE METHODS FOR CARRYING OUT THE PRESENT INVENTION

The present invention provides a process for the continuous catalytic conversion of a wide variety of carbo-metallic oils to lower molecular weight products, while maximizing production of highly valuable liquid products, and making it possible, if desired, to avoid vacuum distillation and other expensive treatments such as hydrotreating. The term "oils", includes not only those predominantly hydrocarbon compositions which are liquid at room temperature (i.e., 68° F.), but also those predominantly hydrocarbon compositions which are asphalts or tars at ambient temperature but liquify when heated to temperatures in the range of up to about 800° F. The invention is applicable to carbo-metallic oils, whether of petroleum origin or not. For example, provided they have the requisite boiling range, carbon residue on pyrolysis and heavy metals content, the invention may be applied to the processing of such widely diverse materials as heavy bottoms from crude oil, heavy bitumen crude oil, those crude oils known as "heavy crude" which approximate the properties of reduced crude, shale oil, tar sand extract, products from coal liquification and solvated coal, atmospheric and vacuum reduced crude, extracts and/or bottoms (raffinate) from solvent de-asphalting, aromatic extract from lube oil refining, tar bottoms, heavy cycle oil, slop oil, other refinery waste streams and mixtures of the foregoing. Such mixtures can for instance be prepared by mixing available hydrocarbon fractions, including oils, tars, pitches and the like. Also, powdered coal may be suspended in the carbo-metallic oil. Persons skilled in the art are aware of techniques for demetalation of carbo-metallic oils, and demetalated oils may be converted using the invention; but is is an advantage of the invention that it can employ as feedstock carbo-metallic oils that have had no prior demetalation treatment. Likewise, the invention can be applied to hydrotreated feedstocks; but it is an advantage of the invention that it can successfully convert carbo-metallic oils which have had substantially no prior hydrotreatment. However, the preferred application of the process is to reduced crude, i.e., that fraction of crude oil boiling at and above 650° F., alone or in admixture with virgin gas oils. While the use of material that has been subjected to prior vacuum distillation is not excluded, it is an advantage of the invention that it can satisfactorily process material which has had no prior vacuum distillation, thus saving on capital investment and operating costs as compared to conventional FCC processes that require a vacuum distillation unit.

In accordance with the invention one provides a carbo-metallic oil feedstock, at least about 70%, more preferably at least about 85% and still more preferably about 100% (by volume) of which boils at and above about 650° F. All boiling temperatures herein are based on standard atmospheric pressure conditions. In carbo-metallic oil partly or wholly composed of material which boils at and above about 650° F., such material is referred to herein as 650° F.+ material; and 650° F.+ material which is part of or has been separated from an oil containing components boiling above and below 650° F. may be referred to as a 650° F.+ fraction. but the terms "boils above" and "650° F.+" are not intended to imply that all of the material characterized by said terms will have the capability of boiling. The carbo-metallic oils contemplated by the invention may contain material which may not boil under any conditions; for example, certain asphalts and asphaltenes may crack thermally during distillation, apparently without boiling. Thus, for example, when it is said that the feed comprises at least about 70% by volume of material which boils above about 650° F., it should be understood that the 70% in question may include some material which will not boil or volatilize at any temperature. These non-boilable materials when present, may frequently or for the most part be concentrated in portions of the feed which do not boil below about 1000° F., 1025° F. or higher. Thus, when it is said that at least about 10%, more preferably about 15% and still more preferably at least about 20% (by volume) of the 650° F.+ fraction will not boil below about 1000° F. or 1025° F., it should be understood that all or any part of the material not boiling below about 1000° or 1025° F.,may or may not be volatile at and above the indicated temperatures.

Preferably, the contemplated feeds, or at least the 650° F.+ material therein, have a carbon residue on pyrolysis of at least about 2 or greater. For example, the Conradson carbon content may be in the range of about 2 to about 12 and most frequently at least about 4. A particularly common range is about 4 to about 8. Those feeds having a Conradson carbon content greater than about 6 especially need special means for controlling excess heat.

Preferably, the feed has an average composition characterized by an atomic hydrogen to carbon ratio in the range of about 1.2 to about 1.9, and preferably about 1.3 to about 1.8.

The carbo-metallic feeds employed in accordance with the invention, or at least the 650° F.+ material therein, may contain at least about 4 parts per million of Nickel Equivalents, as defined above, of which at least about 2 parts per million is nickel (as metal, by weight). Carbo-metallic oils within the above range can be prepared from mixtures of two or more oils, some of which do and some of which do not contain the quantities of Nickel Equivalents and nickel set forth above. It should also be noted that the above values for Nickel Equivalents and nickel represent time-weighted averages for a substantial period of operation of the conversion unit, such as one month, for example. It should also be noted that the heavy metals have in certain circumstances exhibited some lessening of poisoning tendency after repeated oxidations and reductions on the catalyst, and the literature describes criteria for establishing "effective metal" values. For example, see the article by Cimbalo, et al, entitled "Deposited Metals Poison FCC Catalyst", *Oil and Gas Journal*, May 15, 1972, pp 112–122, the contents of which are incorporated herein by reference. If considered necessary or desirable, the contents of Nickel Equivalents and nickel in the carbo-metallic oils processed according to the invention may be expressed in terms of "effective metal" values. Notwithstanding the gradual reduction in poisoning activity noted by Cimbalo, et al., the regeneration of catalyst under normal FCC regeneration conditions may not, and usually does not, severely impair the dehydrogenation, demethanation and aromatic condensation activity of heavy metals accumulated on cracking catalyst.

It is known that about 0.2 to about 5 weight percent of "sulfur" in the form of elemental sulfur and/or its compounds (but reported as elemental sulfur based on the weight of feed) appears in FCC feeds and that the sulfur and modified forms of sulfur can find that way into the resultant gasoline product and, where lead is added, tend to reduce its susceptibility to octane enhancement. Sulfur in the product gasoline often requires sweetening when processing high sulfur containing crudes. To the extent that sulfur is present in the coke, it also represents a potential air pollutant since the regenerator burns it to $SO_2$ and $SO_3$. However, we have found that in our process the sulfur in the feed is on the other hand able to inhibit heavy metal activity by maintaining metals such as Ni, V, Cu and Fe in the sulfide form in the reactor. These sulfides are much less active than the metals themselves in promoting dehydrogenation and coking reactions. Accordingly, it is acceptable to carry out the invention with a carbo-metallic oil having at least about 0.3%, acceptably more than about 0.8% and more acceptably at least about 1.5% by weight of sulfur in the 650° F.+ fraction.

The carbo-metallic oils useful in the invention may and usually do contain significant quantities of compounds containing nitrogen, a substantial portion of which may be basic nitrogen. For example, the total nitrogen content of the carbo-metallic oils may be at least about 0.05% by weight. Since cracking catalysts owe their cracking activity to acid sites on the catalyst surface or in its pores, basic nitrogen-containing compounds may temporarily neutralize these sites, poisoning the catalyst. However, the catalyst is not permanently damaged since the nitrogen can be burned off the catalyst during regeneration, as a result of which the acidity of the active sites is restored.

The carbo-metallic oils may also include significant quantities of pentane insolubles, for example at least about 0.5% by weight, and more typically 2% or more or even about 4% or more. These may include for instance asphaltenes and other materials.

Alkali and alkaline earth metals generally do not tend to vaporize in large quantities under the distillation conditions employed in distilling crude oil to prepare the vacuum gas oils normally used as FCC feedstocks. Rather, these metals remain for the most part in the "bottoms" fraction (the non-vaporized high boiling portion) which may for instance be used in the production of asphalt or other by-products. However, reduced crude and other carbo-metallic oils are in many cases bottoms products, and therefore may contain significant quantities of alkali and alkaline earth metals such as sodium. These metals deposit upon the catalyst during cracking. Depending on the composition of the catalyst and magnitude of the regeneration temperatures to which it is exposed, these metals may undergo interactions and reactions with the catalyst (including the catalyst support) which are not normally experienced in processing VGO under conventional FCC processing conditions. If the catalyst characteristics and regeneration conditions so require, one will of course take the necessary precautions to limit the amounts of alkali and alkaline earth metal in the feed, which metals may enter the feed not only as brine associated with the crude oil in its natural state, but also as components of water or steam which are supplied to the cracking unit. Thus, careful desalting of the crude used to prepare the carbo-metallic feed may be important when the catalyst is particularly susceptible to alkali and alkaline earth metals. In such circumstances, the content of such metals (hereinafter collectively referred to as "sodium") in the feed can be maintained at about 1 ppm or less, based on the weight of the feedstock. Alternatively, the sodium level of the feed may be keyed to that of the catalyst, so as to maintain the sodium level of the catalyst which is in use substantially the same as or less than that of the replacement catalyst which is charged to the unit.

According to a particularly preferred embodiment of the invention, the carbo-metallic oil feedstock constitutes at least about 70% by volume of material which boils above about 650° F., and at least about 10% of the material which boils above about 650° F. will not boil below about 1025° F. The average composition of this 650° F.+ material may be further characterized by: (a) an atomic hydrogen to carbon ratio in the range of about 1.3 to about 1.8: (b) a Conradson carbon value of at least about 2; (c) at least about four parts per million of Nickel Equivalents, as defined above, of which at least about two parts per million is nickel (as metal, by weight); and (d) at least one of the following: (i) at least about 0.3% by weight of sulfur, (ii) at least about 0.05% by weight of nitrogen, and (iii) at least about 0.5% by weight of pentane insolubles. Very commonly, the preferred feed will include all of (i), (ii), and (iii), and other components found in oils of petroleum and non-petroleum origin may also be present in varying quantities providing they do not prevent operation of the process.

Although there is no intention of excluding the possibility of using a feedstock which has previously been subjected to some cracking, the present invention has the definite advantage that it can successfully product large conversions and very substantial yields of liquid hydrocarbon fuels from carbo-metallic oils which have not been subjected to any substantial amount of cracking. Thus, for example, and preferably, at least about 85%, more preferably at least about 90% and most preferably substantially all of of the carbo-metallic feed introduced into the present process is oil which has not previously been contacted with cracking catalyst under cracking conditions. Moreover, the process of the invention is suitable for operation in a substantially once-through or single pass mode. Thus, the volume of recycle, if any, based on the volume of fresh feed is preferably about 15% or less and more preferably about 10% or less.

In general, the weight ratio of catalyst to fresh feed (feed which has not previously been exposed to cracking catalyst under cracking conditions) used in the process is in the range of about 3 to about 18. Preferred and more preferred ratios are about 4 to about 12, more preferably about 5 to about 10 and still more preferably about 6 to about 10, a ratio of about 10 presently being considered most nearly optimum. Within the limitations of product quality requirements, controlling the catalyst to oil ratio at relatively low levels within the aforesaid ranges tends to reduce the coke yield of the process, based on fresh feed.

In conventional FCC processing of VGO, the ratio between the number of barrels per day of plant throughput and the total number of tons of catalyst undergoing circulation throughout all phases of the process can vary widely. For purposes of this disclosure, daily plant through-put is defined as the number of barrels of fresh feed boiling above about 650° F. which that plant processes per average day of operation to liquid products boiling below about 430° F. For example, in one commercially successful type of FCC-VGO operation, about 8 to about 12 tons of catalyst are under circulation in the process per 1000 barrels per day of plant throughput. In another commercially successful process, this ratio is in the range of about 2 to 3. While the present invention may be practiced in the range of about 2 to about 30 and more typically about 2 to about 12 tons of catalyst inventory per 1000 barrels of daily plant through-put, it is preferred to carry out the process of the present invention with a very small ratio of catalyst weight to daily plant through-put. More specifically, it is preferred to carry out the process of the present invention with an inventory of catalyst that is sufficient to contact the feed for the desired residence time in the above indicated catalyst to oil ratio while minimizing the amount of catalyst inventory, relative to plant through-put, which is undergoing circulation or being held for treatment in other phases of the process such as, for example, stripping, regeneration and the like. Thus, more particularly, it is preferred to carry out the process of the present invention with about 2 to about 5 and more preferably about 2 tons of catalyst inventory or less per thousand barrels of daily plant through-put.

In the practice of the invention, catalyst may be added continuously or periodically, such as, for example, to make up for normal losses of catalyst from the system. Moreover, catalyst addition may be conducted in conjunction with withdrawal of catalyst, such as, for example, to maintain or increase the average activity level of the catalyst in the unit. For example, the rate at which virgin catalyst is added to the unit may be in the range of about 0.1 to about 3, more preferably about 0.15 to about 2, and most preferably to about 0.2 to about 1.5 pounds per barrel of feed. If on the other hand equilibrium catalyst from FCC operation is to be utilized, replacement rates as high as about 5 pounds per barrel can be practiced. Where circumstances are such that the catalyst employed in the unit is below average in resistance to deactivation and/or conditions prevailing in the unit are such as to promote more rapid deactivation, one may employ rates of addition greater than those stated above; but in the opposite circumstances, lower rates of addition may be employed. By way of illustration, if a unit were operated with a metal(s) loading of 5000 ppm Ni+V in parts by weight on equilibrium catalyst, one might for example employ a replacement rate of about 2.7 pounds of catalyst introduced for each barrel (42 gallons) of feed processed. However, operation at a higher level such as 10,000 ppm Ni+V on catalyst would enable one to substantially reduce the replacement rate, such as for example to about 1.3 pounds of catalyst per barrel of feed. Thus, the levels of metal(s) on catalyst and catalyst replacement rates may in general be respectively increased and decreased to any value consistent with the catalyst activity which is available and desired for conducting the process.

Without wishing to be bound by any theory, it appears that a number of features of the process to be described in greater detail below, such as, for instance, the residence time and optional mixing of steam with the feedstock, tend to restrict the extent to which cracking conditions produce metals in the reduced state on the catalyst from heavy metal sulfide(s), sulfate(s) or oxide(s) deposited on the catalyst particles by prior exposures to carbo-metallic feedstocks and regeneration conditions. Thus, the process appears to afford significant control over the poisoning effect of heavy metals on the catalyst even when the accumulations of such metals are quite substantial.

Accordingly, the process may be practised with catalyst bearing accumulations of heavy metal(s) in the form of elemental metal(s), oxide(s), sulfide(s) or other compounds which heretofore would have been considered quite intolerable in conventional FCC-VGO operations. Thus, operation of the process with catalyst bearing heavy metals accumulations in the range of about 3,000 or more ppm Nickel Equivalents, on the average, is contemplated. The concentration of Nickel Equivalents of metals on catalyst can range up to about 50,000 ppm or higher. More specifically, the accumulation may be in the range of about 3,000 to about 30,000 ppm, preferably in the range of 3,000 to 20,000 ppm, and more particularly about 3,000 to about 12,000 ppm. Within these ranges just mentioned, operation at metals levels of about 4,000 or more, about 5,000 or more, or about 7,000 or more ppm can tend to reduce the rate of catalyst replacement required. The foregoing ranges are based on parts per million of Nickel Equivalents, in which the metals are expressed as metal, by weight, measured on and based on regenerated equilibrium catalyst. However, in the event that catalyst of adequate activity is available at very low cost, making feasible very high rates of catalyst replacement, the carbo-metallic oil could be converted to lower boiling liquid products with catalyst bearing less than 3,000 ppm Nickel Equivalents of heavy metals. For example, one might employ equilibrium catalyst from another unit, for example, an FCC unit which has been used in the cracking of a feed, e.g. vacuum gas oil, having a carbon residue on pyrolysis of less than 1 and containing less than about 4 ppm Nickel Equivalents of heavy metals.

In any event, the equilibrium concentration of heavy metals in the circulating inventory of catalyst can be controlled (including maintained or varied as desired or needed) by manipulation of the rate of catalyst addition discussed above. Thus, for example, addition of catalyst may be maintained at a rate which will control the heavy metals accumulation on the catalyst in one of the ranges set forth above.

In general, it is preferred to employ a catalyst having a relatively high level of cracking activity, providing high levels of conversion and productivity at low residence times. The conversion capabilities of the catalyst may be expressed in terms of the conversion produced during actual operation of the process and/or in terms of conversion produced in standard catalyst activity tests. For example, it is preferred to employ catalyst which, in the course of extended operation under prevailing process conditions, is sufficiently active for sustaining a level of conversion of at least about 50% and more preferably at least about 60%. In this connection, conversion is expressed in liquid volume percent, based on fresh feed.

Also, for example, the preferred catalyst may be defined as one which, in its virgin or equilibrium state, exhibits a specified activity expressed as a percentage in terms of MAT (micro-activity test) conversion. For purposes of the present invention the foregoing percentage is the volume percentage of standard feedstock which a catalyst under evaluation will convert to 430° F. end point gasoline, lighter products and coke at 900° F., 16 WHSV (weight hourly space velocity, calculated on a moisture free basis, using clean catalyst which has been dried at 1100° F., weighed and then conditioned, for a period of at least 8 hours at about 25° C. and 50% relative humidity, until about one hour or less prior to contacting the feed) and 3C/O (catalyst to oil weight ratio) by ASTM D-32 MAT test D-3907-80, using an appropriate standard feedstock, e.g. a sweek light primary gas oil, such as that used by Davison, Division of W. R. Grace, having the following analysis and properties:

| | |
|---|---|
| API Gravity at 60° F., degrees | 31.0 |
| Specific Gravity at 60° F., g/cc | 0.8708 |
| Ramsbottom Carbon, wt. % | 0.09 |
| Conradson Carbon, wt. % (est.) | 0.04 |
| Carbon, wt. % | 84.92 |
| Hydrogen, wt. % | 12.94 |
| Sulfur, wt. % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffins, Vol. % | 31.7 |
| Olefins, Vol. % | 1.6 |
| Naphthenes, Vol. % | 44.0 |
| Aromatics, Vol. % | 22.7 |
| Average Molecular Weight | 284 |
| Nickel | Trace |
| Vanadium | Trace |
| Iron | Trace |
| Sodium | Trace |
| Chlorides | Trace |
| B S & W | Trace |
| Distillation | ASTM D-1160 |
| IBP | 445 |
| 10% | 601 |

-continued

| | |
|---|---|
| 30% | 664 |
| 50% | 701 |
| 70% | 734 |
| 90% | 787 |
| FBP | 834 |

The gasoline end point and boiling temperature-volume percent relationships of the product produced in the MAT conversion test may for example be determined by simulated distillation techniques, for example modifications of gas chromate graphic "Sim-D", ASTM D-2887-73. The results of such simulations are in reasonable agreement with the results obtained by subjecting larger samples of material to standard laboratory distillation techniques. Conversion is calculated by subtracting from 100 the volume percent (based on fresh feed) of those products heavier than gasoline which remain in the recovered product.

On pages 935-937 of Hougen and Watson, *Chemical Process Principles*, John Wiley & Sons, Inc., N.Y. (1947), the concent of "Activity Factors" is discussed. This concept leads to the use of "relative activity" to compare the effectiveness of an operating catalyst against a standard catalyst, as developed by Shankland and Schmiticons. Relative activity measurements facilitate recognition of how the quantity requirements of various catalysts differ from one another. Thus, relative activity is a ratio obtained by dividing the weight of a standard or reference catalyst which is or would be required to produce a given level of conversion, as compared to the weight of an operating catalyst (whether proposed or actually used) which is or would be required to produce the same level of conversion in the same or equivalent feedstock under the same or equivalent conditions. Said ratio of catalyst weights may be expressed as a numerical ratio, but preferably is converted to a percentage basis. The standard catalyst is preferably chosen from among catalysts useful for conducting the present invention, such as for example zeolite fluid cracking catalysts, and is chosen for its ability to produce a predetermined level of conversion in a standard feed under the conditions of temperature, WHSV, catalyst to oil ratio and other conditions set forth in the preceding description of the MAT conversion test and in ASTM D-32 MAT test D-3907-80. Conversion is the volume percentage of feedstock that is converted to 430° F. end-point gasoline, lighter products and coke. For standard feed, one may employ the above-mentioned light primary gas oil, or equivalent.

For purposes of conducting relative activity determinations, one may prepare a "standard catalyst curve", a chart or graph of conversion (as above defined) vs. reciprocal WHSV for the standard catalyst and feedstock. A sufficient number of runs is made under ASTM D-3907-80 conditions (as modified above) using standard feedstock at varying levels of WHSV to prepare an accurate "curve" of conversion vs. WHSV for the standard feedstock. This curve should traverse all or substantially all of the various levels of conversion including the range of conversion within which it is expected that the operating catalyst will be tested. From this curve, one may establish a standard WHSV for test comparisons and a standard value of reciprocal WHSV corresponding to that level of conversion which has been chosen to represent 100% relative activity in the standard catalyst. For purposes of the present disclosure the aforementioned reciprocal WHSV and level of conversion are, respectively, 0.0625 and 75%. In testing an operating catalyst of unknown relative activity, one conducts a sufficient number of runs with that catalyst under D-3907-80 conditions (as modified above) to establish the level of conversion which is or would be produced with the operating catalyst at standard reciprocal WHSV. Then, using the above-mentioned standard catalyst curve, one establishes a hypothetical reciprocal WHSV constituting the reciprocal WHSV which would have been required, using the standard catalyst, to obtain the same level of conversion which was or would be exhibited, by the operating catalyst at standard WHSV. The relative activity may then be calculated by dividing the hypothetical reciprocal WHSV by the reciprocal standard WHSV, which is 1/16, or 0.0625. The result is relative activity expressed in terms of a decimal fraction, which may then be multiplied by 100 to convert to percent relative activity. In applying the results of this determination, a relative activity of 0.5, or 50%, means that it would take twice the amount of the operating catalyst to give the same conversion as the standard catalyst, i.e., the production catalyst is 50% as active as the reference catalyst.

The catalyst may be introduced into the process in its virgin form or, as previously indicated, in other than virgin form; e.g. one may use equilibrium catalyst withdrawn from another unit, such as catalyst that has been employed in the cracking of a different feed. Whether characterized on the basis of MAT conversion activity or relative activity, the preferred catalysts may be described on the basis of their activity "as introduced" into the process of the present invention, or on the basis of their "as withdrawn" or equilibrium activity in the process of the present invention, or on both of these bases. A preferred activity level of virgin and non-virgin catalyst "as introduced" into the process of the present invention is at least about 60% by MAT conversion, and preferably at least about 20%, more preferably at least about 40% and still more preferably at least about 60% in terms of relative activity. However, it will be appreciated that, particularly in the case of non-virgin catalysts supplied at high addition rates, lower activity levels may be acceptable. An acceptable "as withdrawn" or equilibrium activity level of catalyst which has been used in the process of the present invention is at least about 20% or more, but about 40% or more and preferably about 60% or more are preferred values on a relative activity basis, and an activity level of 60% or more on a MAT conversion basis is also contemplated. More preferably, it is desired to employ a catalyst which will, under the conditions of use in the unit, establish an equilibrium activity at or above the indicated level. The catalyst activities are determined with catalyst having less than 0.01 coke, e.g. regenerated catalyst.

One may employ any hydrocarbon cracking catalyst having the above indicated conversion capabilities. A particularly preferred class of catalysts includes those which have pore structures into which molecules of feed material may enter for adsorption and/or for contact with active catalytic sites within or adjacent the pores. Various types of catalysts are available within this classification, including for example the layered silicates, e.g. smectites. Although the most widely available catalysts within this classification are the well-known zeolite-containing catalysts, non-zeolite catalysts are also contemplated.

The preferred zeolite-containing catalysts may include any zeolite, whether natural, semi-synthetic or synthetic alone or in admixture with other materials which do not significantly impair the suitability of the catalyst, provided the resultant catalyst has the activity and pore structure referred to above. For example, if the virgin catalyst is a mixture, it may include the zeolite component associated with or dispersed in a porous refractory inorganic oxide carrier, in such case the catalyst may for example contain about 1% to about 60%, more preferably about 15 to about 50%, and most typically about 20 to about 45% by weight, based on the total weight of catalyst (water free basis) of the zeolite, the balance of the catalyst being the porous refractory inorganic oxide alone or in combination with any of the known adjuvants for promoting or suppressing various desired and undesired reactions. For a general explanation of the genus of zeolite, molecular sieve catalysts useful in the invention, attention is drawn to the disclosures of the articles entitled "Refinery Catalysts Are a Fluid Business" and "Making Cat Crackers Work On Varied Diet", appearing respectively in the July 26, 1978 and Sept. 13, 1978 issues of Chemical Week magazine. The descriptions of the aforementioned publications are incorporated herein by reference.

For the most part, the zeolite components of the zeolite-containing catalysts will be those which are known to be useful in FCC cracking processes. In general, these are crystalline aluminosilicates, typically made up of tetra coordinated aluminum atoms associated through oxygen atoms with adjacent silicon atoms in the crystal structure. However, the term "zeolite" as used in this disclosure contemplates not only aluminosilicates, but also substances in which the aluminum has been partly or wholly replaced, such as for instance by gallium and/or other metal atoms, and further includes substances in which all or part of the silicon has been replaced, such as for instance by germanium. Titanium and zirconium substitution may also be practiced.

Most zeolites are prepared or occur naturally in the sodium form, so that sodium cations are associated with the electronegative sites in the crystal structure. The sodium cations tend to make zeolites inactive and much less stable when exposed to hydrocarbon conversion conditions, particularly high temperatures. Accordingly, the zeolite may be ion exchanged, and where the zeolite is a component of a catalyst composition, such ion exchanging may occur before or after incorporation of the zeolite as a component of the composition. Suitable cations for replacement of sodium in the zeolite crystal structure include ammonium (decomposable to hydrogen), hydrogen, rare earth metals, alkaline earth metals, etc. Various suitable ion exchange procedures and cations which may be exchanged into the zeolite crystal structure are well known to those skilled in the art.

Examples of the naturally occuring crystalline aluminosilicate zeolites which may be used as or included in the catalyst for the present invention are faujasite, mordenite, clinoptilote, chabazite, analcite, crionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, ptolite, nephline, matrolite, offretite and sodalite.

Examples of the synthetic crystalline aluminosilicate zeolites which are useful as or in the catalyst for carrying out the present invention are Zeolite X, U.S. Pat.

No. 2,882,244, Zeolite Y, U.S. Pat. No. 3,130,007; and Zeolite A, U.S. Pat. No. 2,882,243; as well as Zeolite B, U.S. Pat. No. 3,008,803; Zeolite D, Canada Pat. No. 661,981; Zeolite E, Canada Pat. No. 614,495; Zeolite F, U.S. Pat. No. 2,996,358; Zeolite H. U.S. Pat. No. 3,010,789; Zeolite J., U.S. Pat. No. 3,011,869; Zeolite L, Belgian Pat. No. 575,177; Zeolite M., U.S. Pat. No. 2,995,423, Zeolite O, U.S. Pat. No. 3,140,252; Zeolite Q, U.S. Pat. No. 2,991,151; Zeolite S, U.S. Pat. No. 3,054,657, Zeolite T, U.S. Pat. No. 2,950,952; Zeolite W, U.S. Pat. No. 3,012,853; Zeolite Z, Canada Pat. No. 614,495; and Zeolite Omega, Canada Pat. No. 817,915. Also, ZK-4HJ, alpha beta and ZSM-type zeolites are useful. Moreover, the zeolites described in U.S. Pat. Nos. 3,140,249, 3,140,253, 3,944,482 and 4,137,151 are also useful, the disclosures of said patents being incorporated herein by reference.

The crystalline aluminosilicate zeolites having a faujasite-type crystal structure are particularly preferred for use in the present invention. This includes particularly natural faujasite and Zeolite X and Zeolite Y.

The crystalline aluminosilicate zeolites, such as synthetic faujasite, will under normal conditions crystallize as regularly shaped, discrete particles of about one to about ten microns in size, and, accordingly, this is the size range frequently found in commercial catalysts which can be used in the invention. Preferably, the particle size of the zeolites is from about 0.1 to about 10 microns and more preferably is from about 0.1 to about 2 microns or less. For example, zeolites prepared in situ from calcined kaolin may be characterized by even smaller crystallites. Crystalline zeolites exhibit both an interior and an exterior surface area, which we have defined as "portal" surface area, with the largest portion of the total surface area being internal. By portal surface area, we refer to the outer surface of the zeolite crystal through which reactants are considered to pass in order to convert to lower boiling products. Blockages of the internal channels by, for example, coke formation, blockages of entrance to the internal channels by deposition of coke in the portal surface area, and contamination by metals poisoning, will greatly reduce the total zeolite surface area. Therefore, to minimize the effect of contamination and pore blockage, crystals larger than the normal size cited above are preferably not used in the catalysts of this invention. Commercial zeolite-containing catalysts are available with carriers containing a variety of metal oxides and combination thereof, including for example silica, alumina, magnesia, and mixtures thereof and mixtures of such oxides with clays as e.g. described in U.S. Pat. No. 3,034,948. One may for example select any of the zeolite-containing molecular sieve fluid cracking catalysts which are suitable for production of gasoline from vacuum gas oils. However, certain advantages may be attained by judicious selection of catalysts having marked resistance to metals. A metal resistant zeolite catalyst is, for instance, described in U.S. Pat. No. 3,944,482, in which the catalyst contains 1–40 weight percent of a rear earth-exchanged zeolite, the balance being a refractory metal oxide having specified pore volume and size distribution. Other catalysts described as "metals-tolerant" are described in the above mentioned Cimbalo et al article.

In general, it is preferred to employ catalysts having an over-all particle size in the range of about 5 to about 160, more preferably about 40 to about 120, and most preferably about 40 to about 80 microns. For example, a useful catalyst may have a skeletal density of about 150 pounds per cubic foot and an average particle size of about 60–70 microns, with less than 10% of the particles having a size less than about 40 microns and less than 80% having a size less than about 50–60 microns.

Although a wide variety of other catalysts, including both zeolite-containing and non-zeolite-containing may be employed in the practice of the invention the following are examples of commercially available catalysts which may be employed in practicing the invention:

TABLE 2

| | Specific Surface $m^2/g$ | Zeolite Content | Weight Percent | | | | |
|---|---|---|---|---|---|---|---|
| | | | $Al_2O_3$ | $SiO_2$ | $Na_2O$ | $Fe_2O$ | $TiO_2$ |
| AGZ-290 | 300 | 11.0 | 29.5 | 59.0 | 0.40 | 0.11 | 0.59 |
| GRZ-1 | 162 | 14.0 | 23.4 | 69.0 | 0.10 | 0.4 | 0.9 |
| CCZ-220 | 129 | 11.0 | 34.6 | 60.0 | 0.60 | 0.57 | 1.9 |
| Super DX | 155 | 13.0 | 31.0 | 65.0 | 0.80 | 0.57 | 1.6 |
| F-87 | 240 | 10.0 | 44.0 | 50.0 | 0.80 | 0.70 | 1.6 |
| FOX-90 | 240 | 8.0 | 44.0 | 52.0 | 0.65 | 0.65 | 1.1 |
| HFZ 20 | 310 | 20.0 | 59.0 | 40.0 | 0.47 | 0.54 | 2.75 |
| HEZ 55 | 210 | 19.0 | 59.0 | 35.2 | 0.60 | 0.60 | 2.5 |

The AGZ-290, GRZ-1, CCZ-220 and Super DX catalysts referred to above are products of W. R. Grace and Co. F-87 and FOC-90 are products of Filtrol, while HFZ-20 and HEZ-55 are products of Engelhard/Houdry. The above are properties of virgin catalyst and, except in the case of zeolite content, are adjusted to a water free basis, i.e. based on material ignited at 1750° F. The zeolite content is derived by comparison of the X-ray intensities of a catalyst sample and of a standard material composed of high purity sodium Y zeolite in accordance with draft #6, dated Jan. 9, 1978, of proposed ASTM Standard Method entitled "Determination of the Faujasite Content of a Catalyst."

Among the above mentioned commercially available catalysts, the Super D family and especially a catalyst designated GRZ-1 are particularly preferred. For example, Super DX has given particularly good results with Arabian light crude. The GRZ-1, although substantially more expensive than the Super DX at present, appears somewhat more metalstolerant.

Although not yet commercially available, it is believed that the best catalysts for carrying out the present invention will be those which, according to proposals advanced by Dr. William P. Hettinger, Jr. and Dr. James E. Lewis, are characterized by matrices with feeder pores having large minimum diameters and large mouths to facilitate diffusion of high molecular weight molecules through the matrix to the portal surface area of molecular sieve particles within the matrix. Such matrices preferably also have a relatively large pore volume in order to soak up unvaporized portions of the carbo-metallic oil feed. Thus significant numbers of liquid hydrocarbon molecules can diffuse to active catalytic sites both in the matrix and in sieve particles on the surface of the matrix. In general it is preferred to employ catalysts with matrices wherein the feeder pores have diameters in the range of about 400 to about 6000 angstrom units, and preferably about 1000 to about 6000 angstrom units.

It is considered an advantage that the process of the present invention can be conducted in the substantial absence of tin and/or antimony or at least in the presence of a catalyst which is substantially free of either or both of these metals.

The process of the present invention may be operated with the above described carbo-metallic oil and catalyst as substantially the sole materials charged to the reaction zone. But the charging of additional materials is not excluded. The charging of recycled oil to the reaction zone has already been mentioned. As described in greater detail below, still other materials fulfilling a variety of functions may also be charged. In such case, the carbo-metallic oil and catalyst usually represent the major proportion by weight of the total of all materials charged to the reaction zone.

Certain of the additional materials which may be used perform functions which offer significant advantages over the process as performed with only the carbo-metallic oil and catalyst. Among these functions are: controlling the effects of heavy metals and other catalyst contaminants; enhancing catalyst activity; absorbing excess heat in the catalyst as received from the regenerator; disposal of pollutants or coversion thereof to a form or forms in which they may be more readily separated from products and/or disposed of; controlling catalyst temperature; diluting the carbo-metallic oil vapors to reduce their partial pressure and increase the yield of desired products; adjusting feed/catalyst contact time; donation of hydrogen to a hydrogen deficient carbo-metallic oil feedstock, for example as disclosed in a United States application entitled "Use of Naphtha in Carbo-Metallic Oil Conversion" and filed in the name of George D. Myers on U.S. Ser. No. 246,791 filed Mar. 23, 1981, assisting in the dispersion of the feed; and possibly also distillation of products. Certain of the metals in the heavy metals accumulation on the catalyst are more active in promoting undesired reactions when they are in the form of elemental metal, than they are when in the oxidized form produced by contact with oxygen in the catalyst regenerator. However, the time of contact between catalyst and vapors of feed and product in past conventional catalytic cracking was sufficient so that hydrogen released in the cracking reaction was able to reconvert a significant portion of the less harmful oxides back to the more harmful elemental heavy metals. One can take advantage of this situation through the introduction of additional materials which are in gaseous (including vaporous) form in the reaction zone in admixture with the catalyst and vapors of feed and products. The increased volume of material in the reaction zone resulting from the presence of such additional materials tends to increase the velocity of flow through the reaction zone with a corresponding decrease in the residence time of the catalyst and oxidized heavy metals borne thereby. Because of this reduced residence time, there is less opportunity for reduction of the oxidized heavy metals to elemental form and therefore less of the harmful elemental metals are available for contacting the feed and products.

Added materials may be introduced into the process in any suitable fashion, some examples of which follow. For instance, they may be admixed with the carbo-metallic oil feedstock prior to contact of the latter with the catalyst. Alternatively, the added materials may, if desired, be admixed with the catalyst prior to contact of the latter with the feedstock. Separate portions of the added materials may be separately admixed with both catalyst and carbo-metallic oil. Moreover, the feedstock, catalyst and additional materials may, if desired, be brought together substantially simultaneously. A portion of the added materials may be mixed with catalyst and/or carbo-metallic oil in any of the above described ways, while additional portions are subsequently brought into admixture. For example, a portion of the added materials may be added to the carbo-metallic oil and/or to the catalyst before they reach the reaction zone, while another portion of the added materials is introduced directly into the reaction zone. The added materials may be introduced at a plurality of spaced locations in the reaction zone or along the length thereof, if elongated.

The amount of additional materials which may be present in the feed, catalyst or reaction zone for carrying out the above functions, and others, may be varied as desired; but said amount will preferably be sufficient to substantially heat balance the process. These materials may for example be introduced into the reaction zone in a weight ratio relative to feed of up to about 0.4, preferably in the range of about 0.02 to about 0.4, more preferably about 0.03 to about 0.3 and most preferably about 0.05 to about 0.25.

For example, many or all of the above desirable functions may be attained by introducing $H_2O$ to the reaction zone in the form of steam or of liquid water or a combination thereof in a weight ratio relative to feed in the range of about 0.04 or more, or more preferably about 0.05 to about 0.1 or more. Without wishing to be bound by any theory, it appears that the use of $H_2O$ tends to inhibit reduction of catalyst-borne oxides, sulfites and sulfides to the free metallic form which is believed to promote condensation-dehydrogenation with consequent promotion of coke and hydrogen yield and accompanying loss of product. Moreover, $H_2O$ may also, to some extent, reduce deposition of metals onto the catalyst surface. There may also be some tendency to desorb nitrogen-containing and other heavy contaminant-containing molecules from the surface of the catalyst particles, or at least some tendency to inhibit their absorption by the catalyst. It is also believed that added $H_2O$ tends to increase the acidity of the catalyst by Bronsted acid formation which in turn enhances the activity of the catalyst. Assuming the $H_2O$ as supplied is cooler than the regenerated catalyst and/or the temperature of the reaction zone, the sensible heat involved in raising the temperature of the $H_2O$ upon contacting the catalyst in the reaction zone or elsewhere can absorb excess heat from the catalyst. Where the $H_2O$ is or includes recycled water that contains for example about 500 to about 5000 ppm of $H_2S$ dissolved therein, a number of additional advantages may accrue. The ecologically unattractive $H_2S$ need not be vented to the atmosphere, the recycled water does not require further treatment to remove $H_2S$ and the $H_2S$ may be of assistance in reducing coking of the catalyst by passivation of the heavy metals, i.e. by conversion thereof to the sulfide form which has a lesser tendency than the free metals to enhance coke and hydrogen production. In the reaction zone, the presence of $H_2O$ can dilute the carbo-metallic oil vapors, thus reducing their partial pressure and tending to increase the yield of the desired products. It has been reported that $H_2O$ is useful in combination with other materials in generating hydrogen during cracking; thus it may be able to act as a hydrogen donor for hydrogen deficient carbo-metallic oil feedstocks. The $H_2O$ may also serve certain purely mechanical functions such as: assisting in the atomizing or dispersion of the feed; competing with high molecular weight molecules for adsorption on the surface of the catalyst, thus interrupting coke formation; steam distillation of vaporizable product from unvaporized feed material; and disengagement of product from catalyst upon conclusion of the cracking reaction. It is particularly preferred to bring together $H_2O$, catalyst and carbo-metallic oil substantially simultaneously. For example, one may admix $H_2O$ and feedstock in an atomizing nozzle and immediately direct the resultant spray into contact with the catalyst at the downstream end of the reaction zone.

The addition of steam to the reaction zone is frequently mentioned in the literature of fluid catalytic cracking. Addition of liquid water to the feed is discussed relatively infrequently, compared to the introduction of steam directly into the reaction zone. However, in accordance with the present invention it is particularly preferred that liquid water be brought into intimate admixture with the carbo-metallic oil in a weight ratio of about 0.04 to about 0.25 at or prior to the time of introduction of the oil into the reaction zone, whereby the water (e.g., in the form of liquid water or in the form of steam produced by vaporization of liquid water in contact with the oil) enters the reaction zone as part of the flow of feedstock which enters such zone. Although not wishing to be bound by any theory, it is believed that the foregoing is advantageous in promoting dispersion of the feedstock. Also, the heat of vaporization of the water, which heat is absorbed from the catalyst, from the feedstock, or from both, causes the water to be a more efficient heat sink than steam alone. Preferably the weight ratio of liquid water to feed is about 0.04 to about 0.2 more preferably about 0.05 to about 0.15.

Of course, the liquid water may be introduced into the process in the above described manner or in other ways, and in either event the introduction of liquid water may be accompanied by the introduction of additional amounts of water as steam into the same or different portions of the reaction zone or into the catalyst and/or feedstock. For example, the amount of additional steam may be in a weight ratio relative to feed in the range of about 0.01 to about 0.25, with the weight ratio of total $H_2O$ (as steam and liquid water) to feedstock being about 0.3 or less. The charging weight ratio of liquid water relative to steam in such combined use of liquid water and steam may for example range from about 15 which is presently preferred, to about 0.2. Such ratio may be maintained at a predetermined level within such range or varied as necessary or desired to adjust or maintain heat balance.

Other materials may be added to the reaction zone to perform one or more of the above described functions. For example, the dehydrogenation-condensation activity of heavy metals may be inhibited by introducing hydrogen sulfide gas into the reaction zone. Hydrogen may be made available for hydrogen deficient carbo-metallic oil feedstocks by introducing into the reaction zone either a conventional hydrogen donor diluent such as heavy naphtha or relatively low molecular weight carbon-hydrogen fragment contributors, including for example: light paraffins; low molecular weight alcohols and other compounds which permit or favor intermolecular hydrogen transfer; and compounds that chemically combine to generate hydrogen in the reaction zone such as by reaction of carbon monoxide with water, or with alcohols, or with olefins, or with other materials or mixtures of the foregoing.

All of the above mentioned additional materials (including water), alone or in conjunction with each other or in conjunction with other materials, such as nitrogen or other inert gases, light hydrocarbons, and others, may perform any of the above-described functions for which they are suitable, including without limitation, acting as diluents to reduce feed partial pressure and/or as heat sinks to absorb excess heat present in the catalyst as received from the regeneration step. The foregoing is a discussion of some of the functions which can be performed by materials other than catalyst and carbo-metallic oil feedstock introduced into the reaction zone, and it should be understood that other materials may be added or other functions performed without departing from the spirit of the invention.

The invention may be practiced in a wide variety of apparatus. However, the preferred apparatus includes means for rapidly vaporizing as much feed as possible and efficiently admixing feed and catalyst (although not necessarily in that order), for causing the resultant mixture to flow as a dilute suspension in a progressive flow mode, and for separating the catalyst from cracked products and any uncracked or only partially cracked feed at the end of a predetermined residence time or times, it being preferred that all or at least a substantial portion of the product should be abruptly separated from at least a portion of the catalyst.

For example, the apparatus may include, along its elongated reaction chamber, one or more points for introduction of carbo-metallic feed, one or more points for introduction of catalyst, one or more points for introduction of additional material, one or more points for withdrawal of products and one or more points for withdrawal of catalyst.

The means for introducing feed, catalyst and other material may range from open pipes to sophisticated jets or spray nozzles, it being preferred to use means capable of breaking up the liquid feed into fine droplets. Preferably, the catalyst, liquid water (when used) and fresh feed are brought together in an apparatus similar to that disclosed in U.S. patent application Ser. No. 969,601 of George D. Myers et al., filed Dec. 14, 1978, the entire disclosure of which is hereby incorporated herein by reference. According to a particularly preferred embodiment based on a suggestion which is understood to have emanated from Mr. Steven M. Kovach, the liquid water and carbo-metallic oil, prior to their introduction into the riser, are caused to pass through a propeller, apertured disc, or any appropriate high shear agitating means for forming a "homogenized mixture" containing finely divided droplets of oil and/or water with oil and/or water present as a continuous phase.

It is preferred that the reaction chamber, or at least the major portion thereof, be more nearly vertical than horizontal and have a length to diameter ratio of at least about 10, more preferably about 20 or 25 or more. Use of a vertical riser type reactor is preferred. If tubular, the reactor can be of uniform diameter throughout or may be provided with a continuous or step-wise increase in diameter along the reaction path to maintain or vary the velocity along the flow path.

In general, the charging means (for catalyst and feed) and the reactor configuration are such as to provide a relatively high velocity of flow and dilute suspension of catalyst. For example, the vapor or catalyst velocity in the riser will be usually at least about 25 and more typically at least about 35 feet per second. This velocity may range up to about 55 or about 75 feet or about 100 feet per second or higher. The vapor velocity at the top of the reactor may be higher than that at the bottom and may for example be about 80 feet per second at the top and about 40 feet per second at the bottom. The velocity capabilities of the reactor will in general be sufficient to prevent substantial build-up of catalyst bed in the bottom or other portions of the riser, whereby the catalyst loading in the riser can be maintained below about 4 or 5 pounds, as for example about 0.5 pounds, and below about 2 pounds, as for example 0.8 pound, per cubic foot, respectively, at the upstream (e.g. bottom) and downstream (e.g. top) ends of the riser.

The progressive flow mode involves, for example, flowing of catalyst, feed and products as a stream in a positively controlled and maintained direction established by the elongated nature of the reaction zone. This is not to suggest however that there must be strictly linear flow. As is well known, turbulent flow and "slippage" of catalyst may occur to some extent especially in certain ranges of vapor velocity and some catalyst loadings, although it has been reported adviseable to employ sufficiently low catalyst loadings to restrict slippage and back-mixing.

Most preferably the reactor is one which abruptly separates a substantial portion or all of the vaporized cracked products from the catalyst at one or more points along the riser, and preferably separates substantially all of the vaporized cracked products from the catalyst at the downstream end of the riser. A preferred type of reactor embodies ballistic separation of catalyst and products; that is, catalyst is projected in a direction established by the riser tube, and is caused to continue its motion in the general direction so established, while the products, having lesser momentum, are caused to make an abrupt change of direction, resulting in an abrupt, substantially instantaneous separation of product from catalyst. In a preferred embodiment referred to as a vented riser, the riser tube is provided with a substantially unobstructed discharge opening at its downstream end for discharge of catalyst. An exit port in the side of the tube adjacent the downstream end receives the products. The discharge opening communicates with a catalyst flow path which extends to the usual stripper and regenerator, while the exit port communicates with a product flow path which is substantially or entirely separated from the catalyst flow path and leads to separation means for separating the products from the relatively small portion of catalyst, if any, which manages to gain entry to the product exit port. Examples of a ballistic separation apparatus and technique as above described, are found in U.S. Pat. Nos. 4,066,533 and 4,070,159 to Myers et al, the disclosures of which patents are hereby incorporated herein by reference in their entireties. According to a particularly preferred embodiment, based on a suggestion understood to have emanated from Paul W. Walters, Roger M. Benslay and Dwight F. Barger, the ballistic separation step includes at least a partial reversal of direction by the product vapors upon discharge from the riser tube; that is, the product vapors make a turn or change of direction which exceeds 90° at the riser tube outlet. This may be accomplished for example by providing a cup-like member surrounding the riser tube at its upper end, the ratio of cross-sectional area of the cup-like member relative to the cross-sectional area of the riser tube outlet being low i.e. less than 1 and preferably less than about 0.6. Preferably the lip of the cup is slightly downstream of, or above the downstream end or top of the riser tube, and the cup is preferably concentric with the riser tube. By means of a product vapor line communicating with the interior of the cup but not the interior of the riser tube, having its inlet positioned within the cup interior in a direction upstream of the riser tube outlet, product vapors emanating from the riser tube and entering the cup by reversal of direction are transported away from the cup to catalyst and product separation equipment. Such an arrangement can produce a high degree of completion of the separation of catalyst from product vapors at the riser tube outlet, so that the required amount of auxiliary catalyst separation equipment such as cyclones is greatly reduced, with consequent large savings in capital investment and operating cost.

Preferred conditions for operation of the process are described below. Among these are feed, catalyst and reaction temperatures, reaction and feed pressures, residence time and levels of conversion, coke production and coke laydown on catalyst.

In conventional FCC operations with VGO, the feedstock is customarily preheated, often to temperatures significantly higher than are required to make the feed sufficiently fluid for pumping and for introduction into the reactor. For example, preheat temperatures as high as about 700° or 800° F. have been reported. But in our process as presently practiced it is preferred to restrict preheating of the feed, so that the feed is capable of absorbing a larger amount of heat from the catalyst while the catalyst raises the feed to conversion temperature, at the same time minimizing utilization of external fuels to heat the feedstock. Thus, where the nature of the feedstock permits, it may be fed at ambient temperature. Heavier stocks may be fed at preheat temperatures of up to about 600° F., typically about 200° F. to about 500° F., but higher preheat temperatures are not necessarily excluded.

The catalyst fed to the reactor may vary widely in temperature, for example from about 1100° to about 1600° F., more preferably about 1200° to about 1500° F. and most preferably about 1300° to about 1400° F., with about 1325° to about 1375° being considered optimum at present.

As indicated previously, the conversion of the carbometallic oil to lower molecular weight products may be conducted at a temperature of about 900° to about 1400° F., measured at the reaction chamber outlet. The reaction temperature as measured at said outlet is more preferably maintained in the range of about 965° to about 1300° F., still more preferably about 975° to about 1200° F., and most preferably about 980° to about 1150° F. Depending upon the temperature selected and the properties of the feed, all of the feed may or may not vaporize in the riser.

Although the pressure in the reactor may, as indicated above, range from about 10 to about 50 psia, preferred and more preferred pressure ranges are about 15 to about 35 and about 20 to about 35. In general, the partial (or total) pressure of the feed may be in the range of about 3 to about 30, more preferably about 7 to about 25 and most preferably about 10 to about 17 psia. The feed partial pressure may be controlled or suppressed by the introduction of gaseous (including vaporous) materials into the reactor, such as for instance the steam, water and other additional materials described above. The process has for example been operated with the ratio of feed partial pressure relative to total pressure in the riser in the range of about 0.2 to about 0.8, more typically about 0.3 to about 0.7 and still more typically about 0.4 to about 0.6, with the ratio of added gaseous material (which may include recycled gases and/or steam resulting from introduction of H$_2$O to the riser in the form of steam and/or liquid water) relative to total pressure in the riser correspondingly ranging from about 0.8 to about 0.2, more typically about 0.7 to about 0.3 and still more typically about 0.6 to about 0.4. In the illustrative operations just described, the ratio of the partial pressure of the added gaseous material relative to the partial pressure of the feed has been in the range of about 0.25 to about 4.0, more typically about 0.4 to about 2.3 and still more typically about 0.7 to about 1.7.

Although the residence time of feed and product vapors in the riser may be in the range of about 0.5 to about 10 seconds, as described above, preferred and more preferred values are about 0.5 to about 6 and about 1 to about 4 seconds, with about 1.5 to about 3.0 seconds currently being considered about optimum. For example, the process has been operated with a riser vapor residence time of about 2.5 seconds or less by introduction of copious amounts of gaseous materials into the riser, such amounts being sufficient to provide for example a partial pressure ratio of added gaseous materials relative to hydrocarbon feed of about 0.8 or more. By way of further illustration, the process has been operated with said residence time being about two seconds or less, with the aforesaid ratio being in the range of about 1 to about 2. The combination of low feed partial pressure, very low residence time and ballistic separation of products from catalyst are considered especially beneficial for the conversion of carbo-metallic oils. Additional benefits may be obtained in the foregoing combination when there is a substantial partial pressure of added gaseous material, especially H$_2$O as described above.

Depending upon whether there is slippage between the catalyst and hydrocarbon vapors in the riser, the catalyst riser residence time may or may not be the same as that of the vapors. Thus, the ratio of average catalyst reactor residence time versus vapor reactor residence time, i.e. slippage, may be in the range of about 1 to about 5, more preferably about 1 to about 4 and most preferably about 1 to about 3, with about 1 to about 2 currently being considered optimum.

In practice, there will usually be a small amount of slippage, e.g., at least about 1.05 or 1.2. In an operating unit there may for example be a slippage of about 1.1 at the bottom of the riser and about 1.05 at the top.

In certain types of known FCC units, there is a riser which discharges catalyst and product vapors together into an enlarged chamber, usually considered to be part of the reactor, in which the catalyst is disengaged from product and collected. Continued contact of catalyst, uncracked feed (if any) and cracked products in such enlarged chamber results in an overall catalyst feed contact time appreciably exceeding the riser tube residence times of the vapors and catalysts. When practicing the process of the present invention with ballistic separation of catalyst and vapors at the downstream (e.g. upper) extremity of the riser, such as is taught in the above mentioned Myers et al patents, the riser residence time and the catalyst contact time are substantially the same for a major portion of the feed and product vapors. It is considered advantageous if the vapor riser residence time and vapor catalyst contact time are substantially the same for at least about 80%, more preferably at least about 90% and most preferably at least about 95% by volume of the total feed and product vapors passing through the riser. By denying such vapors continued contact with catalyst in a catalyst disengagement and collection chamber one may avoid a tendency toward re-cracking and diminished selectivity.

In general, the combination of catalyst to oil ratio, temperatures, pressures and residence times should be such as to effect a substantial conversion of the carbo-metallic oil feedstock. It is an advantage of the process that very high levels of conversion can be attained in a single pass; for example the conversion may be in excess of 50% and may range to about 90% or higher. Preferably, the aforementioned conditions are maintained at levels sufficient to maintain conversion levels in the range of about 60 to about 90% and more preferably about 70 to about 85%. The foregoing conversion levels are calculated by subtracting from 100% the percentage obtained by dividing the liquid volume of fresh feed into 100 times the volume of liquid product boiling at the above 430° F. (tbp, standard atmospheric pressure).

These substantial levels of conversion may and usually do result in relatively large yields of coke, such as for example about 4 to about 14% by weight based on fresh feed, more commonly about 6 to about 13% and most frequently about 10 to about 13%. The coke yield can more or less quantitatively deposit upon the catalyst. At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may range as high as about 2%, or about 3%, or even higher.

In common with conventional FCC operations on VGO, the present process includes stripping of spent catalyst after disengagement of the catalyst from product vapors. Persons skilled in the art are acquainted with appropriate stripping agents and conditions for stripping spent catalyst, but in some cases the present process may require somewhat more severe conditions than are commonly employed. This may result, for example, from the use of a carbo-metallic oil having constituents which do not volatilize under the conditions prevailing in the reactor, which constituents deposit themselves at least in part on the catalyst. Such adsorbed, unvaporized material can be troublesome from at least two standpoints. First, if the gases (including vapors) used to strip the catalyst can gain admission to a catalyst disengagement or collection chamber connected to the downstream end of the riser, and if there is an accumulation of catalyst in such chamber, vaporization of these unvaporized hydrocarbons in the stripper can be followed by adsorption on the bed of catalyst in the chamber. More particularly, as the catalyst in the stripper is stripped of adsorbed feed material, the resultant feed material vapors pass through the bed of catalyst accumulated in the catalyst collection and/or disengagement chamber and may deposit coke and/or condensed material on the catalyst in said bed. As the catalyst bearing such deposits moves from the bed and into the stripper and from thence to the regenerator, the condensed products can create a demand for more stripping capacity, while the coke can tend to increase regeneration temperatures and/or demand greater regeneration capacity. For the foregoing reasons, it is preferred to prevent or restrict contact between stripping vapors and catalyst accumulations in the catalyst disengagement or collection chamber. This may be done for example by preventing such accumulations from forming, e.g. with the exception of a quantity of catalyst which essentially drops out of circulation and may remain at the bottom of the disengagement and/or collection chamber, the catalyst that is in circulation may be removed from said chamber promptly upon settling to the bottom of the chamber. Also, to minimize regeneration temperatures and demand for regeneration capacity, it may be desirable to employ conditions of time, temperature and atmosphere in the stripper which are sufficient to reduce potentially volatile hydrocarbon material borne by the stripped catalyst to about 10% or less by weight of the total carbon loading on the catalyst. Such stripping may for example include reheating of the catalyst, extensive stripping with steam, the use of gases having a temperature considered higher than normal for FCC/VGO operations, such as for instance flue gas from the regenerator, as well as other refinery stream gases such as hydrotreater off-gas ($H_2S$ containing), hydrogen and others. For example, the stripper may be operated at a temperature of about 350° F. using steam at a pressure of about 150 psig and a weight ratio of steam to catalyst of about 0.002 to about 0.003. On the other hand, the stripper may be operated at a temperature of about 1025° F. or higher.

Substantial conversion of carbo-metallic oils to lighter products in accordance with the invention tends to produce sufficiently large coke yields and coke laydown on catalyst to require some care in catalyst regeneration. In order to maintain adequate activity in zeolite and non-zeolite catalysts, it is desirable to regenerate the catalyst under conditions of time, temperature and atmosphere sufficient to reduce the percent by weight of carbon remaining on the catalyst to about 0.25% or less, whether the catalyst bears a large heavy metals accumulation or not. Preferably this weight percentage is about 0.1% or less and more preferably about 0.05% or less, especially with zeolite catalysts. The amounts of coke which must therefore be burned off of the catalysts when processing carbo-metallic oils are usually substantially greater than would be the case when cracking VGO. The term coke when used to describe the present invention, should be understood to include any residual unvaporized feed or cracking product, if any such material is present on the catalyst after stripping.

Regeneration of catalyst, burning away of coke deposited on the catalyst during the conversion of the feed, may be performed at any suitable temperature in the range of about 1100° to about 1600° F., measured at the regenerator catalyst outlet. This temperature is preferably in the range of about 1200° to about 1500° F., more preferably about 1275° to about 1425° F. and optimally about 1325° to about 1375° F. The process has been operated, for example, with a fluidized regenerator with the temperature of the catalyst dense phase in the range of about 1300° to about 1400° F.

In accordance with the invention, regeneration is conducted while maintaining the catalyst in one or more fluidized beds in one or more fluidization chambers. Such fluidized bed operations are characterized, for instance, by one or more fluidized dense beds of ebulliating particles having a bed density of, for example, about 25 to about 50 pounds per cubic foot. Fluidization is maintained by passing gases, including combustion supporting gases, through the bed at a sufficient velocity to maintain the particles in a fluidized state but at a velocity which is sufficiently small to prevent substantial entrainment of particles in the gases. For example, the lineal velocity of the fluidizing gases may be in the range of about 0.2 to about 4 feet per second and preferably about 0.2 to about 3 feet per second. The average total residence time of the particles in the one or more beds is substantial, ranging for example from about 5 to about 30, more preferably about 5 to about 20 and still more preferably about 5 to about 10 minutes. From the foregoing, it may be readily seen that the fluidized bed regeneration of the present invention is readily distinguishable from the short-contact, low-density entrainment type regeneration which has been practiced in some FCC operations.

In accordance with the invention the temperature of the catalyst particles during regeneration is controlled by introducing liquid water into the afore-mentioned bed or beds. The water may be introduced in the form of a stream, but is preferably in the form of finely-divided droplets ranging for example from about 0.1 to about 500 microns and preferably about 1 to about 100 microns in size. The water may be introduced to the bed directly, i.e. released from a nozzle or pipe having its outlet in the bed itself, or may be carried into the bed along with the fluidization gas, e.g. combustion-supporting gas, into which the water droplets have been dispersed. Preferably at least a portion of the water is dispersed in the oxidizing gas and carried with it into the regenerator. This is in contrast to the known techniques in which water has been introduced into the dilute phase in a regenerator above a fluidized bed for the purpose of controlling afterburning.

The coke deposited on the catalyst protects the catalyst to some extent from reacting with the steam formed from the liquid water, and in the preferred method of carrying out this invention the liquid water is introduced into a zone wherein the average concentration of coke on the catalyst is at least about 0.1 percent by weight.

The liquid water is introduced into the aforesaid bed or beds of catalyst particles in an amount or amounts effective to control the temperature or temperatures of the catalyst particles within the above stated ranges. For example, the amount of water may be in a weight ratio relative to feed in the range of about 0.01 to about 0.5 preferably about 0.01 to about 0.3 more preferably about 0.02 to about 0.2 and most preferably about 0.03 to about 0.15. Alternatively the quantity of water used may be stated in relationship to the weight of air employed as oxidizing gas, it being understood that the following quantities may be adjusted upwardly or downwardly in proportion to any variation between the oxygen content of the combustion supporting gases and the usual oxygen content of atmospheric air. Thus for example the weight ratio of liquid water to the total amount of air supplied as combustion supporting gas for regeneration may be in the range of about 0.007 to about 0.35, preferably about 0.007 to about 0.2, more preferably about 0.01 to about 0.15, and most preferably about 0.02 to 0.1. The weight ratio of liquid water to the total weight of oxygen consumed may be in the range of about 0.035 to about 1.8, preferably about 0.035 to about 1.0, more preferably about 0.05 to about 0.75 and most preferably about 0.1 to about 0.6. For purposes of the present disclosure and claims, oxygen refers to pure oxygen or to that portion of the oxygen content of oxygen-containing gases which is consumed in combustion. Such oxygen-containing gases may be combustion-supporting compounds containing oxygen such as, for example, $CO_2$ and/or mixtures of free oxygen with other gases, e.g. air. In applying the above ratios it should be understood that the water need not be actually mixed with all of the oxygen, air or other combustion-supporting gas including in the above ratios. Thus the water may be mixed with a portion of the gas and another portion of the gas without water may be introduced into the same zone or a different zone of the regeneration apparatus.

The tables which follow are illustrative of the amounts of water based on feed or air which may be used to attain proper heat balance for varying amounts of coke production, concentration of hydrogen in the coke, and $CO_2$ to $CO$ ratio in the regeneration off gases. Although these calculations ignore the heat losses of the regeneration equipment, such losses are normally small in practice and are usually disregarded.

TABLE 3

Oil inlet temperature = 200° F.
Air inlet temperature = 100° F.
Water temperature = 100° F.
Flue gases = 1450° F.
Reactor products = 1000° F.

| Percent Feed to Coke | Percent Hydrogen in Coke | $CO_2/CO$ | Pounds Water per Pound Feed | Pounds Water per Pound Air |
|---|---|---|---|---|
| 8 | 10 | 4 | 0.01 | 0.009 |
| 10 | 6 | 3 | 0.03 | 0.02 |
| 10 | 6 | 4 | 0.05 | 0.04 |
| 10 | 10 | 3 | 0.13 | 0.09 |
| 10 | 10 | 1 | 0.03 | 0.02 |
| 12 | 6 | 3 | 0.15 | 0.10 |
| 12 | 10 | 3 | 0.26 | 0.16 |
| 12 | 10 | 1 | 0.10 | 0.07 |
| 14 | 6 | 3 | 0.26 | 0.14 |
| 14 | 6 | 1 | 0.11 | 0.07 |

Table 4 below is similar to Table 3, differing only in that the feedstock temperature of 450° F. is used instead of 200° F.

TABLE 4

Oil inlet temperature = 450° F.
Air inlet temperature = 100° F.
Water temperature = 100° F.
Flue gases = 1450° F.
Reactor Products = 1000° F.

| Percent Feed to Coke | Percent Hydrogen in Coke | $CO_2/CO$ | Pounds Water per Pound Feed | Pounds Water per Pound Air |
|---|---|---|---|---|
| 8 | 10 | 4 | 0.13 | 0.11 |
| 10 | 6 | 3 | 0.15 | 0.12 |
| 12 | 6 | 3 | 0.27 | 0.15 |
| 14 | 6 | 3 | 0.38 | 0.21 |
| 10 | 10 | 1 | 0.15 | 0.12 |

The regenerating oxidizing gas may be any gas which can provide oxygen to convert carbon to carbon oxides, and in view of its ready availability, air is highly suitable. The amount of air required per pound of coke for stoichiometric combustion depends upon the hydrogen content and the desired $CO_2/CO$ ratio. The following table gives the weight of air required in pounds per pound of coke oxidized for various levels of hydrogen concentration and $CO_2/CO$ ratios.

TABLE 5

Pounds of Air Required per Pound of Coke

| % Hydrogen | $CO_2/CO$ Ratio | | | | |
| | 100% $CO_2$ | 3/1 | 1/1 | 0.5/1 | 100% CO |
|---|---|---|---|---|---|
| 2 | 12.9 | 11.4 | 9.9 | 8.9 | 7.0 |

TABLE 5-continued

Pounds of Air Required per Pound of Coke

| % Hydrogen | $CO_2/CO$ Ratio | | | | |
| | 100% $CO_2$ | 3/1 | 1/1 | 0.5/1 | 100% CO |
|---|---|---|---|---|---|
| 6 | 14.2 | 12.8 | 11.3 | 10.3 | 8.4 |
| 10 | 15.0 | 13.7 | 12.2 | 11.4 | 9.5 |

When regenerating catalyst to very low levels of carbon on regenerated catalyst, e.g. about 0.1% or less or about 0.05% or less, based on the weight of regenerated catalyst, it is acceptable to burn off at least about the last 10% or at least about the last 5% by weight of coke (based on the total weight of coke on the catalyst immediately prior to regeneration) in contact with combustion producing gases containing excess oxygen. In this connection it is contemplated that some selected portion of the coke, ranging from all of the coke down to about the last 5 or 10% by weight, can be burned with excess oxygen. By excess oxygen is meant an amount in excess of the stoichiometric requirement for burning all of the hydrogen, all of the carbon and all of the other combustible components, if any, which are present in the above-mentioned selected portion of the coke immediately prior to regeneration. The gaseous products of combustion conducted in the presence of excess oxygen will normally include an appreciable amount of free oxygen. Such free oxygen, unless removed from the by-product gases or converted to some other from by a means or process other than regeneration, will normally manifest itself as free oxygen in the flue gas from the regenerator unit. In order to provide sufficient driving force to complete the combustion of the coke with excess oxygen, the amount of free oxygen will normally be not merely appreciable put substantial, i.e. there will be a concentration of at least about 2 mole percent of free oxygen in the total regeneration flue gas recovered from the entire, completed regeneration operation. While such technique is effective in attaining the desired low levels of carbon on regenerated catalyst, it has its limitations and difficulties as will become apparent from the discussion below.

Heat released by combustion of coke in the regenerator is absorbed by the catalyst and can be readily retained thereby until the regenerated catalyst is brought into contact with fresh feed. When processing carbometallic oils to the relatively high levels of conversion involved in the present invention, the amount of regenerator heat which is transmitted to fresh feed by way of recycling regenerated catalyst can substantially exceed the level of heat input which is appropriate in the riser for heating and vaporizing the feed and other materials, for supplying the endothermic heat of reaction for cracking, for making up the heat losses of the unit and so forth. Thus, in accordance with the invention, the amount of regenerator heat transmitted to fresh feed may be controlled, or restricted where necessary, within certain approximate ranges. The amount of heat so transmitted may for example be in the range of about 500 to about 1200, more particularly about 600 to about 900, and more particularly about 650 to about 850 BTUs per pound of fresh feed. The aforesaid ranges refer to the combined heat, in BTUs per pound of fresh feed, which is transmitted by the catalyst to the feed and reaction products (between the contacting of feed with catalyst and the separation of product from catalyst) for supplying the heat of reaction (e.g. for cracking) and the difference in enthalpy between the products and the fresh feed. Not included in the foregoing are the heat made available in the reactor by the adsorption of coke on the catalyst, nor the heat consumed by heating, vaporizing or reacting recycle streams and such added materials as water, steam naphtha and other hydrogen donors, flue gases and inert gases, or by radiation and other losses.

One or a combination of techniques may be utilized in this invention for controlling or restricting the amount of regeneration heat transmitted via catalyst to fresh feed. For example, one may add a combustion modifier to the cracking catalyst in order to reduce the temperature of combustion of coke to carbon dioxide and/or carbon monoxide in the regenerator. Moreover, one may remove heat from the catalyst through heat exchange means, including for example heat exchangers (e.g. steam coils) built into the regenerator itself, whereby one may extract heat from the catalyst during regeneration. Heat exchangers can be built into catalyst transfer lines, such as for instance the catalyst return line from the regenerator to the reactor, whereby heat may be removed from the catalyst after it is regenerated. The amount of heat imparted to the catalyst in the regenerator may be restricted by reducing the amount of insulation on the regenerator to permit some heat loss to the surrounding atmosphere, especially if feeds of exceedingly high coking potential are planned for processing; in general, such loss of heat to the atmosphere is considered economically less desirable than certain of the other alternatives set forth herein. One may also inject cooling fluids into portions of the regenerator other than those occupied by the dense bed, for example water and/or steam, whereby the amount of inert gas available in the regenerator for heat absorption and removal is increased.

Another suitable and preferred technique for controlling or restricting the heat transmitted to fresh feed via recycled regenerated catalyst involves maintaining a specified ratio between the carbon dioxide and carbon monoxide formed in the regenerator while such gases are in heat exchange contact or relationship with catalyst undergoing regeneration. In general, all or a major portion by weight of the coke present on the catalyst immediately prior to regeneration is removed in at least one combustion zone in which the aforesaid ratio is controlled as described below. More particularly, at least the major portion more preferably at least about 65% and more preferably at least about 80% by weight of the coke on the catalyst is removed in a combustion zone in which the molar ratio of $CO_2$ to $CO$ is maintained at a level substantially below 5, e.g. about 4 or less. Looking at the $CO_2/CO$ relationship from the inverse standpoint, it is preferred that the $CO/CO_2$ molar ratio should be at least about 0.25 and preferably at least about 0.3 and still more preferably about 1 or more or even 1.5 or more. While persons skilled in the art are aware of techniques for inhibiting the burning of $CO$ to $CO_2$, it has been suggested that the mole ratio of $CO:CO_2$ should be kept less than 0.2 when regenerating catalyst with large heavy metal accumulations resulting from the processing of carbo-metallic oils, in this connection see for example U.S. Pat. No. 4,162,213 to Zrinscak, Sr. et al. In this invention, however, maximizing $CO$ production while regenerating catalyst to about 0.1% carbon or less, and preferably about 0.05% carbon or less, is a particularly preferred embodiment of this invention. Moreover, according to a preferred method of carrying out the invention the sub-process of regeneration, as a whole, may be carried out to the above-mentioned low levels of carbon on regenerated catalyst with a deficiency of oxygen; more specifically, the total oxygen supplied to the one or more stages of regeneration can be and preferably is less than the stoichiometric amount which would be required to burn all hydrogen in the coke to $H_2O$ and to burn all carbon in the coke to $CO_2$. If the coke includes other combustibles, the aforementioned stoichiometric amount can be adjusted to include the amount of oxygen required to burn them.

Still another particularly preferred technique for controlling or restricting the regeneration heat imparted to fresh feed via recycled catalyst involves the diversion of a portion of the heat borne by recycled catalyst to added materials introduced into the reactor, such as the water, steam, naphtha, other hydrogen donors, flue gases, inert gases, and other gaseous or vaporizable materials which may be introduced into the reactor.

The larger the amount of coke which must be burned from a given weight of catalyst, the greater the potential for exposing the catalyst to excessive temperatures. Many otherwise desirable and useful cracking catalysts are particularly susceptible to deactivation at high temperatures, and among these are quite a few of the costly molecular sieve or zeolite types of catalyst. The crystal structures of zeolites and the pore structures of the catalyst carriers generally are somewhat susceptible to thermal and/or hydrothermal degradation. The use of such catalysts in catalytic conversion processes for carbo-metallic feeds creates a need for regeneration techniques which will not destroy the catalyst by exposure to highly severe temperatures and steaming. Such need can be met by a multi-stage regeneration process which includes conveying spent catalyst into a first regeneration zone and introducing oxidizing gas thereto. The amount of oxidizing gas that enters said first zone and the concentration of oxygen or oxygen bearing gas therein are sufficient for only partially effecting the desired conversion of coke on the catalyst to carbon oxide gases. The partially regenerated catalyst is then removed from the first regeneration zone and is conveyed to a second regeneration zone. Oxidizing gas is introduced into the second regeneration zone to provide a higher concentration of oxygen or oxygen-containing gas than in the first zone, to complete the removal of carbon to the desired level. The regenerated catalyst may then be removed from the second zone and recycled to the reactor for contact with fresh feed. An example of such multi-stage regeneration process is described in U.S. patent application Ser. No. 969,602 of George D. Myers et al., filed Dec. 14, 1978, the entire disclosure of which is hereby incorporated herein by reference. Another example may be found in U.S. Pat. No. 2,938,739.

Multi-stage regeneration offers the possibility of combining oxygen deficient regeneration with the control of the $CO:CO_2$ molar ratio. Thus, about 50% or more, more preferably about 65% to about 95%, and more preferably about 80% to about 95% by weight of the coke on the catalyst immediately prior to regeneration may be removed in one or more stages of regeneration in which the molar ratio of $CO:CO_2$ is controlled in the manner described above. In combination with the foregoing, the last 5% or more, or 10% or more by weight of the coke originally present, up to the entire amount of coke remaining after the preceding stage or stages, can be removed in a subsequent stage of regeneration in which more oxygen is present. Such process is susceptible of operation in such a manner that the total flue gas recovered from the entire, completed regeneration operation contains little or no excess oxygen, i.e. on the order of about 0.2 mole percent or less, or as low as about 0.1 mole percent or less, which is substantially less than the 2 mole percent which has been suggested elsewhere. Thus, multi-stage regeneration is particularly beneficial in that it provides another convenient technique for restricting regeneration heat transmitted to fresh feed via regenerated catalyst and/or reducing the potential for thermal deactivation, while simultaneously affording an opportunity to reduce the carbon level on regenerated catalyst to those very low percentages (e.g. about 0.1% or less) which particularly enhance catalyst activity. For example, a two-stage regeneration process may be carried out with the first stage burning about 80% of the coke at a bed temperature of about 1300° F. to produce CO and $CO_2$ in a molar ratio of $CO/CO_2$ of about 1 and the second stage burning about 20% of the coke at a bed temperature of about 1350° F. to produce substantially all $CO_2$ mixed with free oxygen. Use of the gases from the second stage as combustion supporting gases for the first stage, along with additional air introduced into the first stage bed, results in an overall CO to $CO_2$ ratio of about 0.6, with a catalyst residence time of about 5 to 15 minutes total in the two zones. Moreover, where the regeneration conditions, e.g. temperature or atmosphere, are substantially less severe in the second zone than in the first zone (e.g. by at least about 10 and preferably at least about 20° F.), that part of the regeneration sequence which involves the most severe conditions is performed while there is still an appreciable amount of coke on the catalyst. Such operation may provide some protection of the catalyst from the more severe conditions. A particularly preferred embodiment of the invention is two-stage fluidized regeneration at a maximum temperature of about 1500° F. with a reduced temperature of at least about 10° or 20° F. in the dense phase of the second stage as compared to the dense phase of the first stage, and with reduction of carbon on catalyst to about 0.05% or less or even about 0.025% or less by weight in the second zone. In fact, catalyst can readily be regenerated to carbon levels as low as 0.01% by this technique, even though the carbon on catalyst prior to regeneration is as much as about 1%.

In most circumstances, it will be important to insure that no adsorbed oxygen containing gases are carried into the riser by recycled catalyst. Thus, whenever such action is considered necessary, the catalyst discharged from the regenerator may be stripped with appropriate stripping gases to remove oxygen containing gases. Such stripping may for instance be conducted at relatively high temperatures, for example about 1350° to about 1370° F., using steam, nitrogen or other inert gas as the stripping gas(es). The use of nitrogen and other inert gases is beneficial from the standpoint of avoiding a tendency toward hydro-thermal catalyst deactivation which may result from the use of steam.

The following comments and discussion relating to metals management, carbon management and heat management may be of assistance in obtaining best results when operating the invention. Since these remarks are for the most part directed to what is considered the best mode of operation, it should be apparent that the invention is not limited to the particular modes of operation discussed below. Moreover, since certain of these comments are necessarily based on theoretical considerations, there is no intention to be bound by any such theory, whether expressed herein or implicit in the operating suggestions set forth hereinafter.

Although discussed separately below, it is readily apparent that metals management, carbon management and heat management are inter-related and interdependent subjects both in theory and practice. While coke yield and coke laydown on catalyst are primarily the result of the relatively large quantities of coke precursors found in carbo-metallic oils, the production of coke is exacerbated by high metals accumulations, which can also significantly affect catalyst performance. Moreover, the degree of success experienced in metals management and carbon management will have a direct influence on the extent to which heat management is necessary. Moreover, some of the steps taken in support of metals management have proved very helpful in respect to carbon and heat management.

As noted previously the presence of a large heavy metals accumulation on the catalyst tends to aggravate the problem of dehydrogenation and aromatic condensation, resulting in increased production of gases and coke for a feedstock of a given Ramsbottom carbon value. The introduction of substantial quantities of $H_2O$ into the reactor, either in the form of steam or liquid water, appears highly beneficial from the standpoint of keeping the heavy metals in a less harmful form, i.e. the oxide rather than metallic form. This is of assistance in maintaining the desired selectivity.

Also, a unit design in which system components and residence times are selected to reduce the ratio of catalyst reactor residence time relative to catalyst regenerator residence time will tend to reduce the ratio of the times during which the catalyst is respectively under reduction conditions and oxidation conditions. This too can assist in maintaining desired levels of selectivity.

Whether the metals content of the catalyst is being managed successfully may be observed by monitoring the total hydrogen plus methane produced in the reactor and/or the ratio of hydrogen to methane thus produced. In general, it is considered that the hydrogen to methane mole ratio should be less than about 1 and preferably about 0.6 or less, with about 0.4 or less being considered about optimum. In actual practice the hydrogen to methane ratio may range from about 0.5 to about 1.5 and average about 0.8 to about 1.

Careful carbon management can improve both selectivity (the ability to maximize production of valuable products), and heat productivity. In general, the techniques of metals control described above are also of assistance in carbon management. The usefulness of water addition in respect to carbon management has already been spelled out in considerable detail in that part of the specification which relates to added materials for introduction into the reaction zone. In general, those techniques which improve dispersion of the feed in the reaction zone should also prove helpful, these include for instance for use of fogging or misting devices to assist in dispersing the feed.

Catalyst to oil ratio is also a factor in heat management. In common with prior FCC practice on VGO, the reactor temperature may be controlled in the practice of the present invention by respectively increasing or decreasing the flow of hot regenerated catalyst to the reactor in response to decreases and increases in reactor temperature, typically the outlet temperature in the case of a riser type reactor. Where the automatic controller for catalyst introduction is set to maintain an excessive catalyst to oil ratio, one can expect unnecessarily large rates of carbon production and heat release, relative to the weight of fresh feed charged to the reaction zone.

Relatively high reactor temperatures are also beneficial from the standpoint of carbon management. Such higher temperatures foster more complete vaporization of feed and disengagement of product from catalyst.

Carbon management can also be facilitated by suitable restriction of the total pressure in the reactor and the partial pressure of the feed. In general, at a given level of conversion, relatively small decreases in the aforementioned pressures can substantially reduce coke production. This may be due to the fact that restricting total pressure tends to enhance vaporization of high boiling components of the feed, encourage cracking and facilitate disengagement of both unconverted feed and higher boiling cracked products from the catalyst. It may be of assistance in this regard to restrict the pressure drop of equipment downstream of and in communication with the reactor. But if it is desired or necessary to operate the system at higher total pressure, such as for instance because of operating limitations (e.g. pressure drop in downstream equipment) the above described benefits may be obtained by restricting the feed partial pressure. Suitable ranges for total reactor pressure and feed partial pressure have been set forth above, and in general it is desirable to attempt to minimize the pressures within these ranges.

The abrupt separation of catalyst from product vapors and unconverted feed (if any) is also of great assistance. It is for this reason that the so-called vented riser apparatus and technique disclosed in U.S. Pat. Nos. 4,070,159 and 4,066,533 to George D. Myers et al is the preferred type of apparatus for conducting this process. For similar reasons, it is beneficial to reduce insofar as possible the elapsed time between separation of catalyst from product vapors and the commencement of stripping. The vented riser and prompt stripping tend to reduce the opportunity for coking of unconverted feed and higher boiling cracked products adsorbed on the catalyst.

A particularly desirable mode of operation from the standpoint of carbon management is to operate the process in the vented riser using a hydrogen donor if necessary, while maintaining the feed partial pressure and total reactor pressure as low as possible, and incorporating relatively large amounts of water, steam and if desired, other diluents, which provide the numerous benefits discussed in greater detail above. Moreover, when liquid water, steam, hydrogen donors, hydrogen and other gaseous or vaporizable materials are fed to the reaction zone, the feeding of these materials provides an opportunity for exercising additional control over catalyst to oil ratio. Thus, for example, the practice of increasing or decreasing the catalyst to oil ratio for a given amount of decrease or increase in reactor temperature may be reduced or eliminated by substituting either appropriate reduction or increase in the charging ratios of the water, steam and other gaseous or vaporizable material, or an appropriate reduction or increase in the ratio of water to steam and/or other gaseous materials introduced into the reaction zone.

Heat management includes measures taken to control the amount of heat released in various parts of the process and/or for dealing successfully with such heat as may be released. Unlike conventional FCC practice using VGO, wherein it is usually a problem to generate sufficient heat during regeneration to heat balance the reactor, the processing of carbometallic oils generally produces so much heat as to require careful management thereof.

Heat management can be facilitated by various techniques associated with the materials introduced into the reactor. Thus, heat absorption by feed can be maximized by minimum preheating of feed, it being necessary only that the feed temperature be high enough so that it is sufficiently fluid for successful pumping and dispersion in the reactor. When the catalyst is maintained in a highly active state with the suppression of coking (metals control), so as to achieve higher conversion, the resultant higher conversion and greater selectivity can increase the heat absorption of the reaction. In general, higher reactor temperatures promote catalyst conversion activity in the face of more refractory and higher boiling constituents with high coking potentials. While the rate of catalyst deactivation may thus be increased, the higher temperature of operation tends to offset this loss in activity. Higher temperatures in the reactor also contribute to enhancement of octane number, thus offsetting the octane depressant effect of high carbon lay down. Other techniques for absorbing heat have also been discussed above in connection with the introduction of water, steam, and other gaseous or vaporizable materials into the reactor.

Another technique employed in heat management is careful stripping. The severe stripping techniques referred to above are useful in controlling the amount of heat released in the regenerator. Each or any combination of the aforementioned techniques or metals management, carbon management and heat management may be practiced in conjunction with the introduction of liquid water into the regeneration bed in accordance with the present invention.

As noted above, the invention can be practiced in the abovedescribed mode and in many others. An illustrative, nonlimiting example is described by the accompanying schematic diagrams in FIG. 1 and by the description of this figure which follows.

Referring in detail to the figure, petroleum feedstock is introduced into the lower end of riser reactor 2 through inlet line 1, at which point it is mixed with hot regenerated catalyst coming through line 5 from regenerator 9.

The feedstock is catalytically cracked in passing up riser 2 and the product vapors are separated from catalyst particles in vessel 3 and are removed through line 4. The catalyst, contaminated with coke, is introduced into bed 23 in upper zone 10 of regenerator 9 through line 7. The rate of flow of catalyst into zone 10 is controlled by valve 8.

Oxidizing gas 20, such as air, is introduced into zone 10 through line 21 together with liquid water 19 introduced into the gas from line 22. A portion of the coke on the catalyst is burned in zone 10 and the partially regenerated catalyst flows downwardly through conduit 18 into lower regeneration zone 25.

An oxidizing gas 11, such as air, is introduced into regeneration zone 25 through conduit 13 where it is mixed with a spray of water 12 from conduit 14. The mixture of oxidizing gas and atomized water flows through gas distribution plate 15 and thus into the bed 16 of catalyst particles. This mixture passes upwardly through the bed 16 of coke-contaminated catalyst particles, fluidizing it as well as reacting with the coke, and passes through perforated plate 17 into the bed of catalyst particles in zone 10.

The perforations in the plate 17 are large enough so that the upwardly flowing gas readily passes therethrough into zone 10. During regeneration of the catalyst the pressure difference between the upper and lower zones prevents catalyst particles from passing downwardly through the plate. Gases within the regenerator comprising combustion products, nitrogen, and steam formed by vaporizing the water added with the oxidizing gas, are separated from suspended catalyst particles by a separator (not shown) and then pass out of the regenerator through conduit 24.

Regenerated catalyst is removed from zone 25 through conduit 5 for return to riser 2, the rate of removal being controlled by valve 6.

The rate of introduction of carbon into the regenerator may be controlled by the rate of introduction of spent catalyst by valve 8 in conduit 7, and the rate of removal of regenerated catalyst by valve 6 in conduit 5. This invention provides far more leeway in the flow control of these reactants since it permits the absorption of heat within the bed of particles without raising the temperature of the bed.

The reaction is carried out so that the amount of carbon remaining on the regenerated catalyst removed from zone 25 is less than about 0.25 percent, preferably less than about 0.1 percent and most preferably less than about 0.05 percent on a substantially moisture-free basis (catalyst dried at 1100° F. for about 4 hours).

In a preferred method of carrying out this invention in a countercurrent flow pattern as in the apparatus in the Figure, the amount of oxidizing gas and catalyst are controlled so that the amount of oxidizing gas passing into zone 25 is greater than that required to convert all the coke on the catalyst in this zone to carbon dioxide, and the amount of oxidizing gas passing upwardly from zone 25 into zone 10 together with the oxidizing gas added to zone 10 from line 21 is insufficient to convert all the coke in zone 10 to carbon dioxide.

Having thus described this invention, the following Example is offered to illustrate the invention in more detail.

EXAMPLE

A carbo-metallic feed at a temperature of about 450° F. is introduced into the bottom zone of a riser reactor at a rate of 2070 pounds per hour where it is mixed with catalyst at a temperature of about 1275° F. The catalyst to oil ratio by weight is 11:1.

The carbo-metallic feed has a heavy metal content of about 5 parts per million nickel equivalents, and a Conradson carbon content of about 7 percent. Substantially all of the feed boils above 650° F.

Within the riser about 75 percent of the feed is converted to fractions boiling at a temperature less than 430° F. About 53 percent of the feed is converted to gasoline. During the conversion 11.2 percent of the feed is converted to coke containing 5.3 percent hydrogen.

The catalyst containing about one percent by weight of coke is removed from the reactor and introduced into a stripper where it is contacted with steam at a temperature of about 1000° F. to remove volatiles adsorbed onto the catalyst. The stripped catalyst is introduced into the upper zone of a two-zone regenerator as shown in the figure at a rate of 23,000 pounds per hour. Each zone contains about 4000 pounds of catalyst. Air mixed with fine water droplets at a temperature of about 100° F. is introduced into the upper zone. The air flow rate is about 1200 pounds per hour and the water flow rate is about 450 pounds per hour. Air is introduced into the lower zone at a rate of about 1400 pounds per hour and at a temperature of about 100° F.

The regenerator flue gases are at a temperature of about 1400° F. and contain $CO_2$ and CO in a mole ratio of 3.6, $CO_2$ and CO being generated at a rate of 14 and 4 pound mols per hour respectively. The temperatures in the upper zone and lower zones are maintained at about 1300° F. and 1340° F. respectively. The catalyst transferred from the upper zone to the lower zone contains about 0.25 percent coke by weight and the catalyst removed from the lower zone and recycled to the reactor riser contains about 0.03 percent coke by weight.

The foregoing example is offered to illustrate this invention and it is obvious that change may be made in the process without departing from the invention.

What is claimed is:

1. A process for economically converting carbo-metallic oils to lighter products, comprising:
   I. providing a converter feed containing 650° F.± material, said 650° F.± material being characterized by a carbon residue on pyrolysis of at least about 1 and by containing at least about 4 parts per million of Nickel Equivalents of heavy metal(s);
   II bringing said converter feed together with particular cracking catalyst to form a stream comprising a suspension of said catalyst in said feed and causing the resultant stream to flow through a progressive flow type reactor having an elongated reaction chamber which is at least in part vertical or inclined for a predetermined vapor riser residence time in the range of about 0.5 to about 10 seconds at a temperature of about 900° to about 1400° F. and under a pressure of about 10 to about 50 pounds per square inch absolute sufficient for causing a conversion per pass in the range of about 50% to about 90% while producing coke in amounts in the range of about 6 to about 14% by weight based on fresh feed, and laying down coke on the catalyst in amounts in the range of about 0.3 to about 3% by weight;
   III. separating spent, coke-laden catalyst from the stream of hydrocarbons formed by vaporized feed and resultant cracking products;
   IV. maintaining a multistage regeneration zone comprising a sequence of separate dense fluidized beds, each of said beds containing catalyst undergoing regeneration with oxygen, said beds being positioned one above the other and arranged for downflow of catalyst from bed to bed through an internal transfer line countercurrent to upwardly flowing regeneration gas to the lowermost bed of catalyst being regenerated, each of said beds being further characterized by a bed density in the range of about 25 to about 50 pounds per cubic foot and by being sustained by a fluidization gas, including a combustion supporting gas containing said oxygen, said fluidization gas having a linear velocity in the range of about 0.2 to about 4 feet per second;
   V. charging said spent catalyst to said uppermost bed of catalyst for downflow through said sequence of catalyst beds; supplying liquid water directly in contact with said catalyst in one or more of said catalyst beds, the weight ratio of the total weight of said water charged to said catalyst beds relative to the total weight of said converter feed charged to said progressive flow conversion zone being in the range of about 0.01 to about 0.5;

VI. retaining said spent catalyst in said multistage regeneration zone in contact with a flow of said oxygen containing combustion supporting gas under conditions of temperature, pressure and catalyst particle residence time in said multistage regeneration zone in the range of from about 5 minutes to about 30 minutes for combustion of said coke on said spent catalyst, whereby said spent catalyst is regenerated to have a level of residual carbon on said regenerated catalyst particles of about 0.25 wt% or less, while forming combustion product flue gases comprising CO and/or $CO_2$; and VII. recycling the regenerated catalyst to the reactor for contact with fresh feed.

2. A process for economically converting carbo-metallic oils to lighter products, comprising:

I. providing a converter feed containing 650° F.+ material, and 650° F.+ material being characterized by a carbon residue on pyrolysis of at least about 1 and by containing at least about 4 parts per million of Nickel Equivalents of heavy metal(s);

II. bringing said converter feed together with particulate cracking catalyst to form a stream comprising a suspension of said catalyst in said feed and causing the resultant stream to flow through a progressive flow type reactor having an elongated reaction chamber which is at least in part vertical or inclined for a predetermined vapor riser residence time in the range of about 0.5 to about 10 seconds at a temperature of about 900° to about 1400° F. and under a pressure of about 10 to about 50 pounds per square inch absolute sufficient for causing a conversion per pass in the range of about 50% to about 90% while producing coke in amounts in the range of about 6 to about 14% by weight based on fresh feed, and laying down coke on the catalyst in amounts in the range of about 0.3 to about 3% by weight;

III. separating spent, coke-laden catalyst from the stream of hydrocarbons formed by vaporized feed and resultant cracking products;

IV. maintaining a multistage regeneration zone comprising a sequence of separate dense fluidized beds, each of said beds containing catalyst undergoing regeneration with oxygen, said beds being positioned one above the other and arranged for downflow of catalyst from bed to bed through an internal transfer line counter-current to upwardly flowing regeneration gas charged to the lowermost bed of catalyst being regenerated, each of said beds being further characterized by a bed density in the range of about 25 to about 50 pounds per cubic foot and by being sustained by a fluidization gas, including a combustion supporting gas containing said oxygen, said fluidization gas having a inear velocity in the range of about 0.2 to about 4 feet per second;

V. charging said spent catalyst to said uppermost bed of catalyst for downflow through said sequence of catalyst beds; supplying liquid water directly in contact with said catalyst in one or more of said catalyst beds, the weight ratio of the total amount of said water introduced to each of said catalyst beds relative to the total weight of oxygen consumed by combustion of coke during regeneration being in the range of about 0.035 to about 1.8

VI. retaining said spent catalyst in said multistage regeneration zone in contact with a flow of said oxygen containing combustion supporting gas under conditions of temperature, pressure and catalyst particle residence time in said multistage regeneration zone in the range of from about 5 to about 30 minutes for combustion of said coke on said spent catalyst whereby said spent catalyst is regenerated to have a level of residual carbon on said regenerated catalyst particles of about 0.25 wt% or less, while forming combustion product flue gases comprising CO and/or $CO_2$; and VII. recylcling the regenerated catalyst to the reactor for contact with fresh feed.

3. A process according to claim 1 or claim 2 wherein said 650° F.+ material represents at least about 70% by volume of said feed and includes at least about 10% by volume of material which will not boil below about 1000° F.

4. A process according to claim 1 or claim 2 wherein the carbon residue of the feed as a whole corresponds with a Conradson carbon value of at least about 2.

5. A process according to claim 1 or claim 2 wherein the carbon residue of the feed as a whole corresponds with a Conradson carbon value of at least about 6.

6. A process according to claim 1 or claim 2 wherein the carbon residue of the feed as a whole corresponds with a Conradson carbon value in the range of about 2 to about 12.

7. A process according to claim 1 or claim 2 wherein the feed as a whole contains at least about 4 parts per million of Nickel Equivalents of heavy metal present in the form of elemental metal(s) and/or metal compound(s), of which heavy metal(s) at least about 2 parts per million is nickel.

8. A process according to claim 1 or 2 wherein the feed as a whole contains at least about 5.5 parts per million of Nickel Equivalents of heavy metal present in the form of elemental metal(s) and/or metal compound(s).

9. A process according to claim 1 or 2 conducted without prior hydrotreating of the feed.

10. A process according to claim 1 or claim 2 conducted without prior removal of asphaltenes from the feed.

11. A process according to claim 1 or claim 2 conducted without prior removal of heavy metal(s) from the feed.

12. A process according to claim 1 or claim 2 wherein the feed comprises less than about 15% by volume of recycled product based on the volume of fresh feed.

13. A process according to claim 1 or claim 2 wherein the catalyst charged to the reactor comprises an accumulation of heavy metal(s) on said catalyst derived from prior contact under conversion conditions with carbo-metallic oil, said accumulation including about 3000 ppm to about 30,000 ppm of Nickel Equivalents of heavy metal(s) by weight, present in the form of elemental metal(s) and/or metal compound(s) measured in regenerated equilibrium catalyst.

14. A process according to claim 1 or claim 2 wherein the catalyst charged to the reactor is a zeolite molecular sieve catalyst containing at least about 15% by weight of sieve.

15. A process according to claim 1 or claim 2 wherein the catalyst charged to the reactor is a zeolite molecular sieve catalyst containing at least about 15% by weight of sieve and comprising an accumulation of heavy metal(s) on said catalyst derived from prior contact under conversion conditions with carbo-metallic oil, said accumulation including about 3000 ppm to about 30,000 ppm of Nickel Equivalents of heavy metal(s) by weight, present in the form of elemental metal(s) and/or metal compound(s), measured in regenerated equilibrium catalyst.

16. A process according to claim 1 or claim 2 wherein makeup catalyst is added to replace catalyst lost or withdrawn from the system, said make-up catalyst as introduced having a relative activity of at least about 60 percent and any withdrawn catalyst having a relative activity as withdrawn of at least about 20 percent.

17. A process according to claim 1 or claim 2 conducted without addition of hydrogen to the reaction zone in which conversion of the feed takes place.

18. A process according to claim 1 or claim 2 conducted in the presence, in the reaction zone, of additional gaseous and/or vaporizable material in a weight ratio, relative to feed, in the range of about 0.02 to about 0.4, said additional gaseous and/or vaporizable material being selected from the group consisting of liquid water, steam, recycled oil, liquid water containing 500 to 5000 ppm hydrogen sulfide, heavy naphtha, low molecular weight alcohols, olefins and other materials permitting or favoring intermolecular hydrogen transfer, and mixtures thereof.

19. A process according to claim 1 or claim 2 wherein the feed is brought together with liquid water in a weight ratio relative to feed in the range of about 0.04 to about 0.25 and wherein a stream is formed containing a mixture of said feed, said catalyst and steam resulting from the vaporization of said liquid water, and is caused to flow through said reactor for converting said feed.

20. A process according to claim 19, in which the weight ratio of liquid water to feed is in the range of about 0.05 to about 0.15.

21. A process according to claim 19 in which the water is brought together with the feed at the time of or prior to bringing the feed into contact with the cracking catalyst.

22. A process according to claim 19 in which the water is brought together with the feed prior to bringing the feed into contact with the cracking catalyst.

23. A process according to claim 1 or claim 2 wherein the predetermined riser residence time of the feed and product vapors is about 3 seconds or less.

24. A process according to claim 1 or claim 2 wherein the temperature in said reactor is maintained in the range of about 975° F. to about 1200° F.

25. A process according to claim 1 or claim 2 wherein the temperature in said reactor is maintained in the range of about 980° F. to about 1150° F.

26. A process according to claim 1 or claim 2 wherein the feed partial pressure is maintained in the range of about 3 to about 30 psia.

27. A process according to claim 1 or claim 2 wherein the feed contains 650° F.+ material which has not been hydrotreated and is characterized in part by containing at least about 5.5 parts per million Nickel Equivalents heavy metal(s), present in the form of elemental metal(s) and/or metal compound(s), said feed being brought together with additional gaseous material including steam whereby the resultant suspension of catalyst and feed flowing through said progressive flow type reactor also includes said additional gaseous material wherein the ratio of the partial pressure of said additional gaseous material relative to the partial pressure of said feed is in the range of about 0.25 to about 2.5, and the vapor residence time of feed and products in the reactor is in the range of about 0.5 to about 3 seconds.

28. A process according to claim 1 or claim 2 wherein all of the feed is cracked in one and the same conversion chamber.

29. A process according to claim 1 or claim 2 wherein the feed is cracked in a substantially single pass mode.

30. A process according to claim 1 or claim 2 conducted with sufficient severity to maintain said conversion in the range of about 60 to about 90%.

31. A process according to claim 1 or claim 2 conducted with sufficient severity to maintain said conversion in the range of about 70 to about 85%.

32. A process according to claim 1 or claim 2 wherein at the end of said predetermined residence time, the catalyst is projected in a direction established by the elongated reaction chamber or an extension thereof, while the products, having lesser momentum, are caused to make an abrupt change of direction relative to the direction in which the catalyst is projected, resulting in an abrupt, substantially instantaneous ballistic separation of products from catalyst.

33. A process according to claim 1 or claim 2 wherein said feed contains 650° F. material which has not been hydrotreated and is characterized in part by containing at least about 5.5 parts per million of Nickel Equivalents heavy metal(s) present as elemental metal(s) and/or metal compound(s), said feed being brought together with additional gaseous material including steam whereby the resultant suspension of catalyst and feed flowing through said progressive flow type reactor also includes said additional gaseous material wherein the ratio of the partial pressure of said additional gaseous material relative to the partial pressure of said feed is in the range of about 0.25 to about 2.5, said vapor residence time of feed and products is in the range of about 0.5 to about 3 seconds and wherein, at the end of said predetermined residence time, said catalyst is projected in a direction established by the elongated reaction chamber or an extension thereof, while the products, having lesser momentum, are caused to make an abrupt change of direction relative to the direction in which the catalyst is projected, resulting in an abrupt, substantially instantaneous ballistic separation of products from catalyst.

34. A process according to claim 1 or claim 2 wherein the catalyst within said regeneration zone or zones to which liquid water is supplied contains, on the average, at least about 0.1% coke.

35. A process according to claim 1 or claim 2 wherein the oxygen is present as a component of a mixture of gases containing free oxygen.

36. A process according to claim 1 or claim 2 wherein the bed density or densities of the fluidized catalyst regeneration bed or beds is in the range of about 30 to about 40 pounds per cubic foot.

37. A process according to claim 1 or claim 2 wherein the fluidization gas for said fluidized catalyst regeneration bed or beds comprises air.

38. A process according to claim 1 or claim 2 wherein the fluidization gas for said fluidized catalyst regeneration bed or beds comprises a mixture of gaseous combustion products derived from the combustion of coke and air which has been partially depleted of its oxygen content by said combustion.

39. A process according to claim 1 or claim 2 wherein the linear velocity of the fluidization gas in said one or more fluidized catalyst regeneration beds is in the range of about 0.2 to about 3 feet per second.

40. A process according to claim 1 or claim 2 wherein liquid water is supplied to one or more of said fluidized beds by discharging said water directly to said bed or beds.

41. A process according to claim 1 or claim 2 wherein the liquid water is supplied to said fluidized regeneration bed or beds by first mixing the liquid water with said combustion supporting gas and then introducing the resultant mixture into said bed or beds.

42. A process according to claim 41 wherein the liquid water is mixed with the combustion supporting gas by spraying, atomizing, fogging or otherwise dispersing droplets of said liquid water into said combustion supporting gas.

43. A process according to claim 42 wherein the liquid water droplets dispersed in said oxygen supporting gas have an average diameter in the range of about 0.1 microns to about 500 microns.

44. A process according to claim 1 or claim 2 wherein said series of distinct regeneration zones includes two regeneration zones each having its own fluidized catalyst regeneration bed, in which catalyst and combustion supporting gas are caused to move through said zones at least partly in countercurrent flow relationship and in which the liquid water is supplied only to the first of said two regeneration zones.

45. A process according to claim 1 or claim 2 wherein the spent catalyst is regenerated as it progresses through a series of distinct regeneration zones which are arranged in sequence and which include separate fluidized catalyst regeneration beds, and in which the liquid water is supplied to each of said plurality of regeneration zones.

46. A process according to claim 1 wherein the weight ratio of the total amount of water introduced into said fluidized regeneration bed or beds relative to the total weight of converter feed is in the range of about 0.01 to about 0.3.

47. A process according to claim 1 wherein the weight ratio of the total amount of water introduced into said fluidized regeneration bed or beds relative to the total weight of converter feed is in the range of about 0.02 to about 0.2.

48. A process according to claim 40 wherein the weight ratio of the total amount of water introduced into said fluidized regeneration zone relative to the total weight of converter feed charged to said riser is in the range of about 0.03 to about 0.15.

49. A process according to claim 2 wherein the weight ratio of the total amount of water introduced into said fluidized regeneration bed or beds relative to the total weight of oxygen consumed by combustion of coke in regeneration is in the range of about 0.035 to about 1.

50. A process according to claim 2 wherein the weight ratio of the total amount of water introduced into said fluidized regeneration bed or beds relative to the total weight of oxygen consumed by combustion of coke in regeneration is in the range of about 0.05 to about 0.75.

51. a process according to claim 2 wherein the weight ratio of the total amount of water introduced into said fluidized regeneration bed or beds relative to the total weight of oxygen consumed by combustion of coke in regeneration is in the range of about 0.1 to about 0.6.

52. A process according to claim 2 wherein the oxygen is present as air and the weight ratio of the total amount of water introduced into said fluidized regeneration bed or beds relative to the total weight of air consumed by combustion of coke in regeneration is in the range of about 0.007 to about 0.35.

53. A process according to claim 2 wherein the oxygen is present as air and the weight ratio of the total amount of water introduced into said fluidized regeneration bed or beds relative to the total weight of air comsumed by combustion of coke in regeneration is in the range of about 0.007 to about 0.2.

54. A process according to claim 2 wherein the oxygen is present as air and the weight ratio of the total amount of water introduced into said fluidized regeneration bed or beds relative to the total weight of air consumed by combustion of coke in regeneration is in the range of about 0.015 to about 0.15.

55. A process according to claim 2 wherein the oxygen is present as air and the weight ratio of the total amount of water introduced into said fluidized regeneration bed or beds relative to the total weight of air consumed by combustion of coke in regeneration is in the range of about 0.02 to about 0.1.

56. A process according to claim 1 or claim 2 wherein said regeneration is conducted at a temperature in the range of about 1100° F. to about 1600° F.

57. A process according to claim 1 or claim 2 wherein said regeneration is conducted at a temperature in the range of about 1200° F. to about 1500° F.

58. A process according to claim 1 or claim 2 wherein said regeneration is conducted at a temperature in the range of about 1275° F. to about 1425° F.

59. A process according to claim 1 or claim 2 wherein the total residence time of said catalyst particles in said regeneration zones is in the range of about 5 to about 20 minutes.

60. A process according to claim 1 or claim 2 wherein the total residence time of said catalyst particles in said regeneration zones is in the range of about 5 to about 10 minutes.

61. A process according to claim 1 or claim 2 wherein $CO_2$ and $CO$ are formed in a $CO_2$ to $CO$ mole ratio of no more than about 4.

62. A process according to claim 1 or claim 2 wherein the amount of coke removed from said catalyst during regeneration represents about 0.5 to about 3% by weight based on the weight of regenerated catalyst.

63. A process according to claim 1 or claim 2 wherein the regenerated catalyst particles contain about 0.1% or less by weight of coke.

64. A process according to claim 1 or claim 2 wherein the regenerated catalyst particles contain about 0.05 or less by weight of coke.

65. A process according to claim 1 or claim 2 comprising:

introducing said spent catalyst into a first fluidized catalyst regeneration bed in a first regeneration zone; introducing into said first fluidized catalyst regeneration bed an amount of oxygen which is insufficient to remove all coke from the spent catalyst in said bed and an amount of liquid water which is sufficient to assist in maintaining the temperature of the catalyst in said first bed below about 1500° F.;

transferring the resultant partially regenerated catalyst from said first fluidized catalyst regeneration bed into a second fluidized catalyst regeneration bed in a second regeneration zone;

introducing into said second fluidized catalyst regeneration bed an amount of air which is in excess of that required to convert all coke on the transferred catalyst to carbon oxides; and separating the resultant regenerated catalyst from the products of combustion.

66. A process according to claim 65 wherein liquid water is mixed with air and the mixture of air and water is introduced into said first bed.

67. A process according to claim 66 wherein additional liquid water is introduced into said second bed.

68. A process according to claim 65 wherein said catalyst is a zeolite molecular sieve catalyst containing at least about 15% by weight of sieve, the carbon residue of the feed as a whole corresponds with a Conradson carbon value of at least about 2, the feed as a whole contains at least about 4 parts per million of Nickel Equivalents of heavy metal(s) present in the form of elemental metal(s) and/or metal compound(s), and said 650° F.+ material represents at least about 70% by volume of said feed and includes at least about 10% by volume of material which will not boil below about 1000° F.

69. A process according to claim 68 wherein the carbon residue of the feed as a whole corresponds with a Conradson carbon value of at least about 6.

70. A process according to claim 65 wherein the total amount of oxygen introduced into said first and second regeneration zones is stoichiometrically insufficient to produce carbon oxides in a $CO_2$ to $CO$ ratio greater than about 4.

* * * * *